United States Patent

Grieco et al.

(10) Patent No.: US 6,598,183 B1
(45) Date of Patent: Jul. 22, 2003

(54) SOFTWARE TOOL FOR AUTOMATED DIAGNOSIS AND RESOLUTION OF PROBLEMS OF VOICE, DATA AND VOIP COMMUNICATIONS NETWORKS

(75) Inventors: Nicholas Grieco, Manalapan, NJ (US); James C. Hofman, Hamilton, NJ (US); Gerry T. Hofman, Burlington, NJ (US); Luigi Grieco, deceased, late of Manalapan, NJ (US), by Nicholas Grieco, personal representative; Michael Brian, Lakewood, NJ (US)

(73) Assignee: Cisco Systems, Inc., San Jose, CA (US)

( * ) Notice: Subject to any disclaimer, the term of this patent is extended or adjusted under 35 U.S.C. 154(b) by 0 days.

(21) Appl. No.: 09/477,504

(22) Filed: Jan. 4, 2000

(51) Int. Cl.[7] .................................................. H04M 1/00
(52) U.S. Cl. .......................................... 714/43; 702/122
(58) Field of Search ............................ 714/43; 702/119, 702/122

(56) References Cited

U.S. PATENT DOCUMENTS

| | | | |
|---|---|---|---|
| 3,764,995 A | 10/1973 | Helf, Jr., et al. .......... 340/172.5 |
| 4,805,089 A | 2/1989 | Lane et al. .................. 364/188 |
| 5,040,111 A | 8/1991 | Al-Salameth et al. ....... 364/200 |
| 5,349,660 A | 9/1994 | Sutula et al. ............... 395/700 |
| 5,386,371 A | 1/1995 | Mather et al. .......... 364/571.08 |
| 5,438,528 A | 8/1995 | Emerson et al. ............. 364/580 |
| 5,475,732 A | * 12/1995 | Pester, III .................... 370/217 |
| 5,541,862 A | 7/1996 | Bright et al. ................ 364/580 |
| 5,602,750 A | 2/1997 | Severt et al. ................ 364/481 |
| 5,608,644 A | 3/1997 | Debacker .................... 364/481 |
| 5,654,901 A | 8/1997 | Boman ........................ 395/712 |
| 5,790,977 A | 8/1998 | Ezekiel ........................ 702/122 |
| 5,794,007 A | 8/1998 | Arrigotti et al. ............ 395/500 |
| 5,812,756 A | * 9/1998 | Taylor .......................... 714/30 |
| 5,845,234 A | 12/1998 | Testa et al. .................. 702/119 |
| 5,920,830 A | 7/1999 | Hatfield et al. ............. 702/119 |
| 6,269,330 B1 | * 7/2001 | Cidon et al. ................. 348/129 |
| 6,351,453 B1 | * 2/2002 | Nolting et al. .............. 370/232 |
| 6,425,096 B1 | * 7/2002 | Liese et al. .................... 714/32 |
| 6,434,502 B1 | * 8/2002 | Harrison ....................... 714/32 |
| 6,442,712 B1 | * 8/2002 | Jeon ............................ 348/129 |

* cited by examiner

*Primary Examiner*—Scott Baderman
*Assistant Examiner*—Anne Damiano
(74) *Attorney, Agent, or Firm*—Wagner Murabito & Hao LLP

(57) ABSTRACT

A computerized system and method for testing and analyzing problems with communications networks is disclosed. The system computerizes and automates the testing of such networks by providing a computer with interface software that can communicate with the variety of different test equipment that is currently available. The system automates process that was previously performed manually by an engineer or technician.

7 Claims, 10 Drawing Sheets

Parameters for test: Impulse Noise Test

Number to Dial: 3002

Not Available:
Not Available:
Not Available:
Not Available:
Not Available:
Not Available:
Not Available:
Not Available:
Not Available:

Impulse Noise Test has 1 parameters

SOFTWARE TOOL FOR AUTOMATED DIAGNOSIS AND RESOLUTION OF PROBLEMS OF VOICE, DATA AND VOIP COMMUNICATIONS NETWORKS

BACKGROUND OF THE INVENTION

The present invention is directed to the field of diagnosis and resolution of problems on Voice, Data, Voice over Data and VoIP (Voice over IP) Communications Networks. The presently available test equipment is manufactured by a variety of different companies. All of the presently available devices and methods suffer from the deficiencies explained below.

The presently available testing methods and equipment for such communications networks generally require a technician or engineer to manually collect data from the test equipment, and then manually analyze the data for any problems. The technician or engineer then is required to develop a remedial plan to solve the problem with the network. This process is slow, expensive, and may require several iterations by the technician or engineer prior to the actual problem being solved. In addition, since the technician or engineer must manually collect the data and then enter the data into a computer for analysis, there are many opportunities for error introduced. Finally, due to the manual nature of these methods, its is difficult to reliably reproduce the exact test parameters.

An additional difficulty that has been encountered with attempting to automate these testing procedures is the great variability of the commercially available communications network test equipment. Due to the diverse nature of the equipment, any software that interfaces with the equipment must be capable of communicating with and controlling all of the varied test equipment in order to have real practical value and application.

The object of the present invention is to solve the problems with the presently available test equipment and procedures by providing a computerized software tool to automate the entire diagnostic process from the control of the test equipment to the production of a report of problems and suggested remedies. Another object of the present invention is to provide a software tool that can communicate with the diverse test equipment of the different manufacturers so that the tool can be universally applied. The present invention accomplishes these objectives by providing software that will analyze the data received from the test equipment, then transmit the data to a data base that will analyze the data based on experience with such networks and then generate a report based on an n-dimensional matrix approach.

SUMMARY OF THE INVENTION

The present invention is directed to a processing system for analyzing problems with communications networks comprising test equipment for the communications networks selected from a plurality of available test equipment and a computer comprising interface software that is capable of communicating with and controlling the plurality of available test equipment through the transmission of electronic signals to the test equipment, a database comprising problems with communications networks and suggested remedies for the problems, means for analyzing data generated by the test equipment to determine problems with the communications networks and comparing those problems to the database to determine suggested remedies for the problems, and means for generating a report for the communications network to be diagnosed. In addition, the present invention is also directed to a computerized method for testing communications networks comprising sending electronic signals from interface software installed on a computer to conventional test equipment for communications networks and thereby causing the test equipment to perform a plurality of tests on the communications network, sending output data generated from the test equipment as a result of the tests performed on the communications network through the interface software to the computer, processing the output data in the computer to identify problems with the communications network using an n-dimensional matrix approach, comparing any problems with the communications network to a data base of problems with communications networks installed on the computer, generating causes and suggested remedies for the problems from the database, and printing a report of the results of the tests conducted on the communications network including the cause and suggested remedy of the problem.

BRIEF DESCRIPTION OF THE DRAWINGS

While this specification concludes with claims particularly pointing out and distinctly claiming that which is regarded as the present invention, the objects and advantages of this invention may be more readily ascertained from the following description of a preferred embodiment when read in conjunction with the accompanying drawings.

FIGS. 2a through 2i represent various input screens for the computerized test method of the present invention.

DETAILED DESCRIPTION OF THE INVENTION

Figure 1:
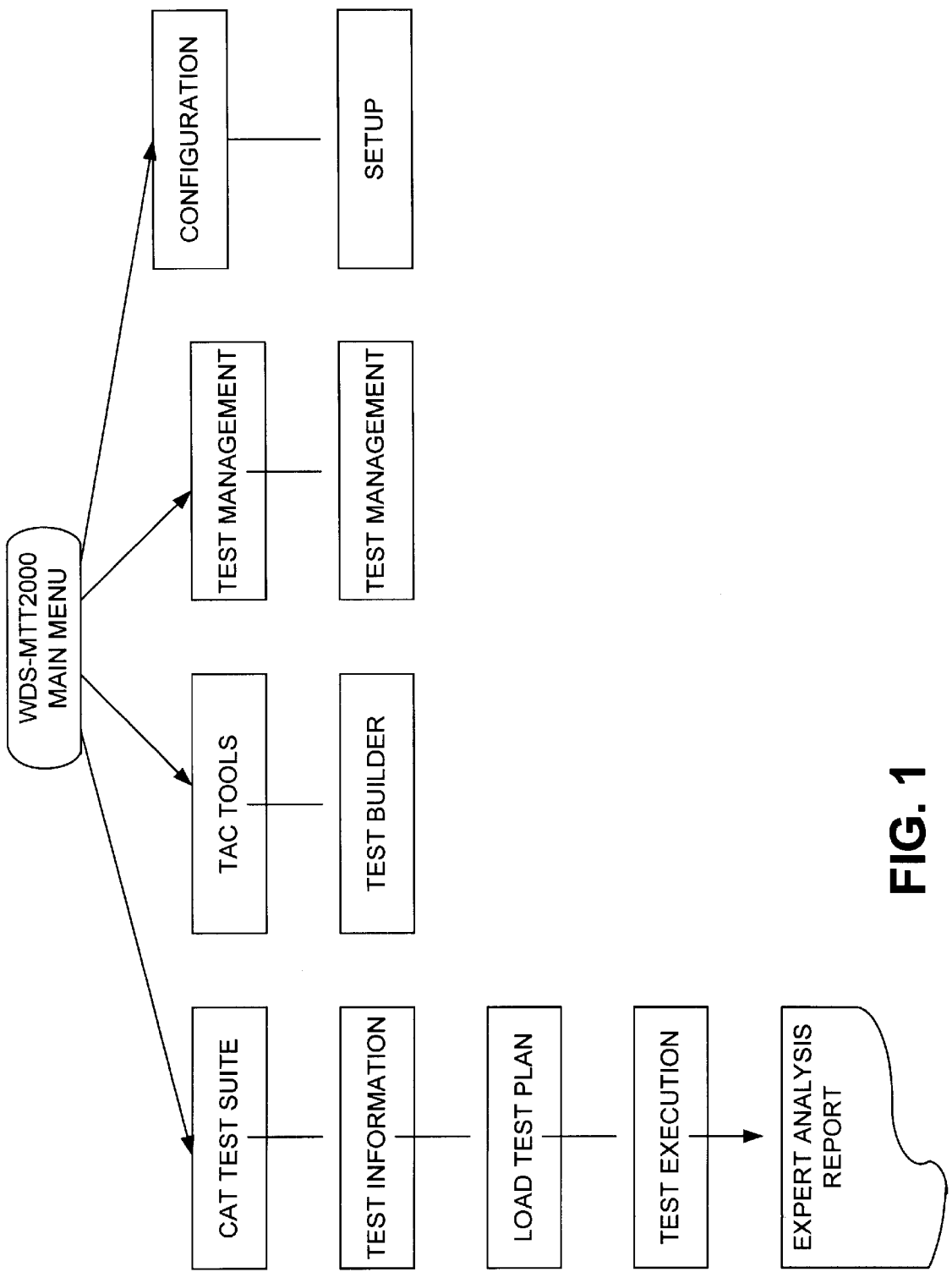
FIG. 1 represents an overall flow chart for the test system of the present invention.

Reference will now be made in detail to the presently preferred embodiments of the present invention.

The present invention is directed to a computerized hardware and software system for automating the test procedures for communications networks. In particular, the present invention is directed to automating the test procedure for Voice, Data, Voice over Data, and VOIP (Voice over IP) Communications Networks. The network to be diagnosed may consist of a plurality of equipment that provides voice, data and voice over data services such as routers, Gateways and PBX's.

The hardware used in an embodiment of the present invention comprises a computer. The computer can be a desktop PC or a laptop computer with a minimum processing speed of 133 mHz, 32 or 64 mB RAM, a serial port as COM1 and a modem port as COM2. The computer should be capable of operating in either Windows 95, Windows CE, Windows 98 or NT 4.0 with service pack 3 NT preferred.

The test equipment used to actually test various parameters on the communications network is any commercially available test equipment such as manufactured by Hewlett-Packard, Model No. 4934A, or other equivalent equipment produced by other manufacturers. The test equipment available from these different manufacturers and also different equipment from the same manufacturer utilize a broad array of different commands during operation. As is known to those of ordinary skill in the art, these commands are unique to each particular piece of test equipment and not compatible.

It is also specifically contemplated that a separate computer will not necessarily be required to practice the present invention. Rather, it is specifically contemplated that the software of the present invention described below can be integrated with the test equipment 12 and utilize a CPU installed on the test equipment 12.

In the prior test methods, an engineer or technician would be required to manually operate the test equipment to evaluate whether a communications network was operating properly. The engineer or technician would obtain output data from the test equipment and then proceed to manually analyze the data to diagnose whatever problem may exist in the communications network. The measurement methods utilized by the test equipment of the present invention must meet IEEE Standard 743-1984. The specifications for the test equipment used in an embodiment of the present invention are as set forth in Table 1.

The present invention also comprises interface software installed on the computer or the test equipment. Among the novel features of the interface software is that the software allows the computer to communicate with the different test equipment produced by the different manufacturers as specified above. The interface software uses the A-Prime™ Script Abstraction Language. The interface software provides an abstraction layer between the present invention and the test equipment and is a common scripting language and accompanying interpreter that allows the present invention to communicate and control essentially all of the commercially available test equipment described above. The interface software will now be described in further detail.

The A-Prime Script Abstraction Language (referred to herein as "SAL") enables the present invention to operate and communicate with the broad range of commercially available test equipment. Some of this test equipment is in use now, some of this test equipment is planned for future expansion and some of the test equipment is not yet developed. Since the full scope of format and content of the scripting languages native to all of the hardware test equipment is not known, some form of abstraction is needed.

The ability of the interface software of the present invention to be rapidly modified in response to customer requests, including the addition of support for new testing hardware is critical to the success of the present invention. With vast differences in the scripting languages used on available test equipment, it was clear that a form of standardization was needed. SAL was developed to address these issues. SAL encapsulates each vendor's diverse scripting languages to produce a common base from which support for new equipment can be quickly added to the present invention.

SAL consists of two components; the (abstracted) scripting language and the software interpreter. The scripting language is the element used to add support for various testing hardware to the present invention in a uniform fashion. The software interpreter is the component that processes SAL language elements into commands that are used to actually control the testing hardware.

The SAL scripting language may be understood though the following example. The following SAL code is used to establish a call between two phone lines connected to a Hewlett-Packard 4934A Transmission Impairment Measurement Set (TIMS):

```
1    ;  Establish call
2    ;  HP TIMS
3    ;  Parameters: Port, Command, Delay
```

-continued

```
4    ;
5    1,RMT,2
6    1,RESET,5
7    1,RMT,2
8    1,DIALON,2
9    2,ATE0,3
10   2,AT,3
11   2,ATDT%0%,16   ; parameter 0 is the number to dial.
12   1,RHOLDON,2
13   1,THOLDON,2
14   1,DIALOFF,3
```

SAL language elements are contained within a single PC computer file. SAL Script files are plain ASCII text. Each SAL instruction is contained on a single line within the file. Individual SAL instructions are separated by a carriage return/line feed (CR/LF). Processing of any SAL instruction line stops when either a CR/LF or a semicolon is reached. Thus, a semicolon can be used to add comment text to a SAL file and this comment text is not processed by the interpreter software. This provides a method of adding notes to a SAL file. The first four lines of the example are comments as is the trailing text in line 11.

SAL instructions contain three parts separated by commas. The first part is the serial I/O port to use for this SAL instruction. The embodiment of the present invention set forth in this example uses two serial I/O ports while conducting tests. One is connected to the test equipment hardware, the other to a modem in the PC. A port value of "1" indicates that the serial I/O port connected to the test equipment hardware is to be used, a value of "2" indicates the modem port is used.

The second part of a SAL instruction is a valid script language statement from the script language of the testing hardware. In line 5 of the example, this is "RMT" which is the command used by the HP 4934A TIMS to put the unit in REMOTE mode. Note that in lines 9, 10 and 11 of the example, modem commands are found since part 1 of those lines indicate that the modem port(2) is to be used.

The third part of a SAL instruction is a delay, or time out for the command. This time out is in seconds and the command is assumed to have failed if a valid response is not received from the device (modem or testing hardware) in the specified amount of seconds.

SAL also supports parameter substitution at runtime. For example, line #11 above is an example of such substitution. It is highly unlikely that each time the example script is run it will be dialing the same phone number so a method of inserting different values, or parameters, at runtime is required. A parameter substitution token consists of a per-cent sign (%), a number and a second percent sign. The number within the percent signs corresponds to a specific parameter (among several) that is to be inserted into the SAL command at that point. The leading "%", the number and the trailing "%" are stripped from the SAL command and the specific parameter as indicated by the number is inserted in its place. Users of the present invention will define parameter values as they create test cases and are substituted by the SAL interpreter at runtime. This allows the same SAL script file to be used to conduct a specific test or function at a variety of values without the need to encode separate SAL files for each case.

The following three examples further exemplify the embodiment of the present invention set forth herein:

EXAMPLE 1

The following example SAL file is used to conduct an Analog Port Loss Performance test using the HP 4934A TIMS:

| | | |
|---|---|---|
| 1 | ; | continued APLP test on same call |
| 2 | ; | HP TIMS |
| 3 | ; | |
| 4 | ; | |
| 5 | | 1,NORM,5 |
| 6 | | 1,LF,5 |
| 7 | | 1,TRMT,2 |
| 8 | | 1,LEV %0%,4 |
| 9 | | 1,FREQ %1%,4 |
| 10 | | 1,RCV,2 |
| 11 | | 1,CLEAR,10 |
| 12 | | 1,DISP?,2 |

Again, all SAL language elements are present. This example demonstrates multiple (2) parameter substitutions. For this test it is desirable to run the test several times on the same call while adjusting the transmit level (line #8) and frequency (line #9) from test to test.

EXAMPLE 2

The following example SAL file is used to establish a call between two phone lines connected to a Hewlett-Packard N1610A Service Advisor using the N1625A Transmission Impairment Measurement Set (TIMS) module:

| | | |
|---|---|---|
| 1 | ; | Establish Call |
| 2 | ; | HP TIMS Module for the Tablet |
| 3 | ; | |
| 4 | ; | Parameters: Port, Command, Delay |
| 5 | ; | |
| 6 | | 1,TIMS:*RST,10 |
| 7 | | 1,tims:route:path:dial:port P1,3 |
| 8 | | 1,tims:route:path:dial:mode bset,3 |
| 9 | ; | make the call |
| 10 | | 2,ATE0,3 |
| 11 | | 2,AT,3 |
| 12 | | 2,ATDT%0%,10 |
| 13 | | 1,Tims:Meas:DPORT,3 |
| 14 | | 1,Tims:Sens:HCIR:State ON,3 |

Note that the format of this SAL command file is identical in structure to the SAL file used to establish a call on the 4934A TIMS. The notable difference is the substitution of the N 1610A/N1625A commands in part 2 of each SAL command.

EXAMPLE 3

The following example SAL file is used to conduct an Analog Port Loss Performance test using the Hewlett-Packard N1610A Service Advisor with the N1625A Transmission Impairment Measurement Set (TIMS) module:

| | | |
|---|---|---|
| 1 | ; | continued APLP test on same call |
| 2 | ; | HP Tablet |
| 3 | ; | |
| 4 | | 1,TIMS:Select:Test:SFLA,2 |
| 5 | | 1,Tims:Module:Audio:State ON,2 |
| 6 | | 1,Tims:Source:Imp 600,2 |
| 7 | | 1,Tims:Source:Freq 1100,2 |
| 8 | | 1,Tims:Source:Lev −10.5,2 |
| 9 | | 1,Tims:Sens:Imp 600,2 |
| 10 | | 1,Tims:Init,2 |
| 11 | | 1,CLEAR,5 |
| 12 | | 1,tims:fetch:att?,3 |

Again, this example is identical in structure to Example1 which performs the same test using the HP 4934A.

The interface software 14 sends electronic signals 16 to the test equipment 12 that cause the test equipment 12 to perform appropriate tests on the communications network in the same manner as if the engineer or technician were manually operating the test equipment 12 directly. The output data 13 from the test equipment 14 is collected through the software 14 and reported back to the computer 10 for processing. This output data 13 is the same data that the technician or engineer would be collecting manually in the prior testing methods.

After the output data 13 is collected by the interface software 14, the software 14 then interprets the output data 13. The interpretation of the output data 13 generates a result and categorizes the result based on industry standards known to those of ordinary skill in the art. The categorization is referred to herein as "the test score." Based on the test score, the software 14 of the preferred embodiment conducts an expert analysis of the communications network by using a one-dimensional and five dimensional matrix approach. However, it is contemplated that other embodiments of the invention may utilize an n-dimensional matrix approach.

FIG. 1 illustrates an overall flow diagram for the computerized test tool of the present invention. FIGS. 2a through 2i illustrate the input screens that an operator of the present invention would use to initiate and operate the computerized test tool of the present invention.

Figure 2A:
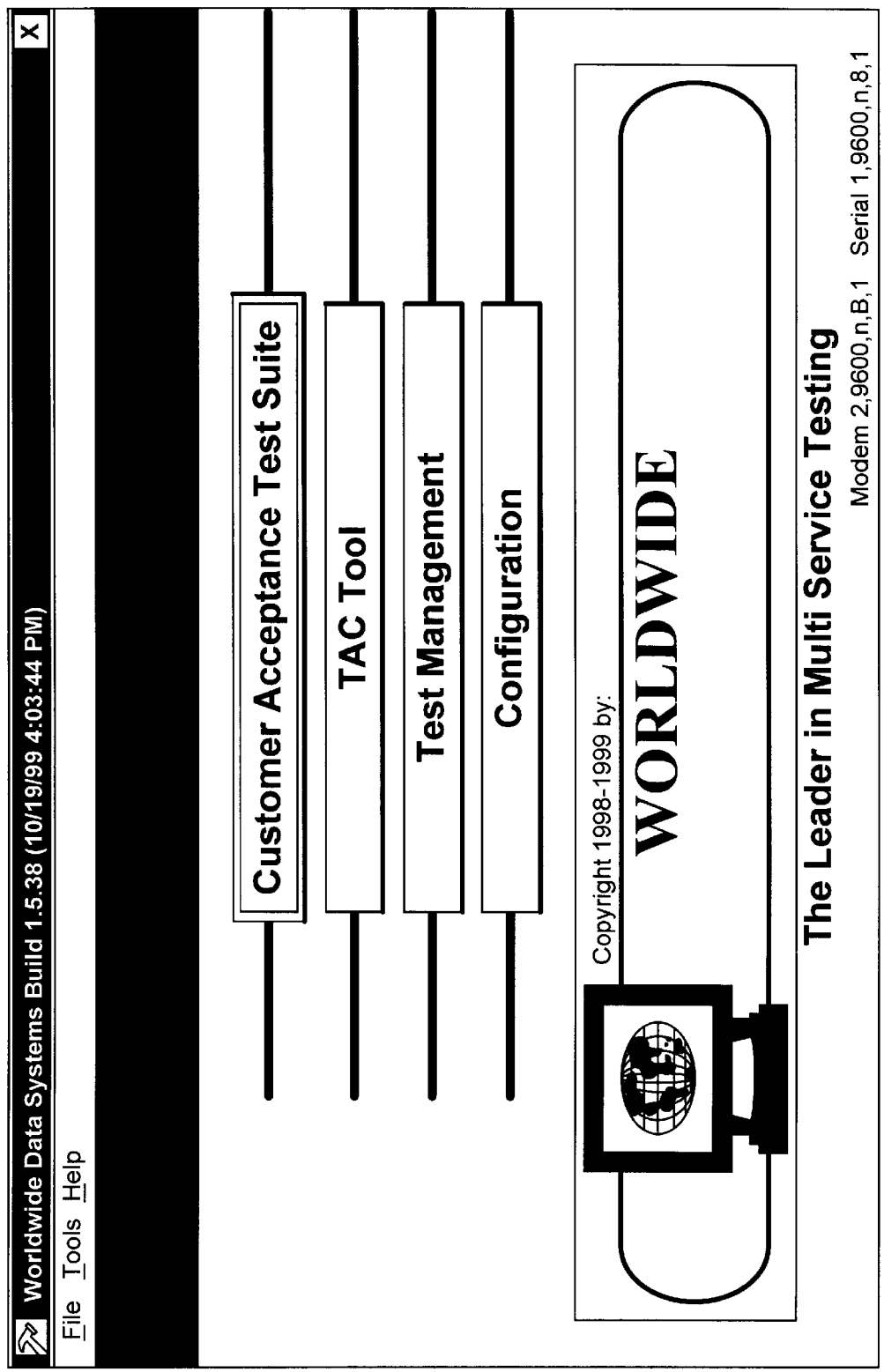
Figure 2B:
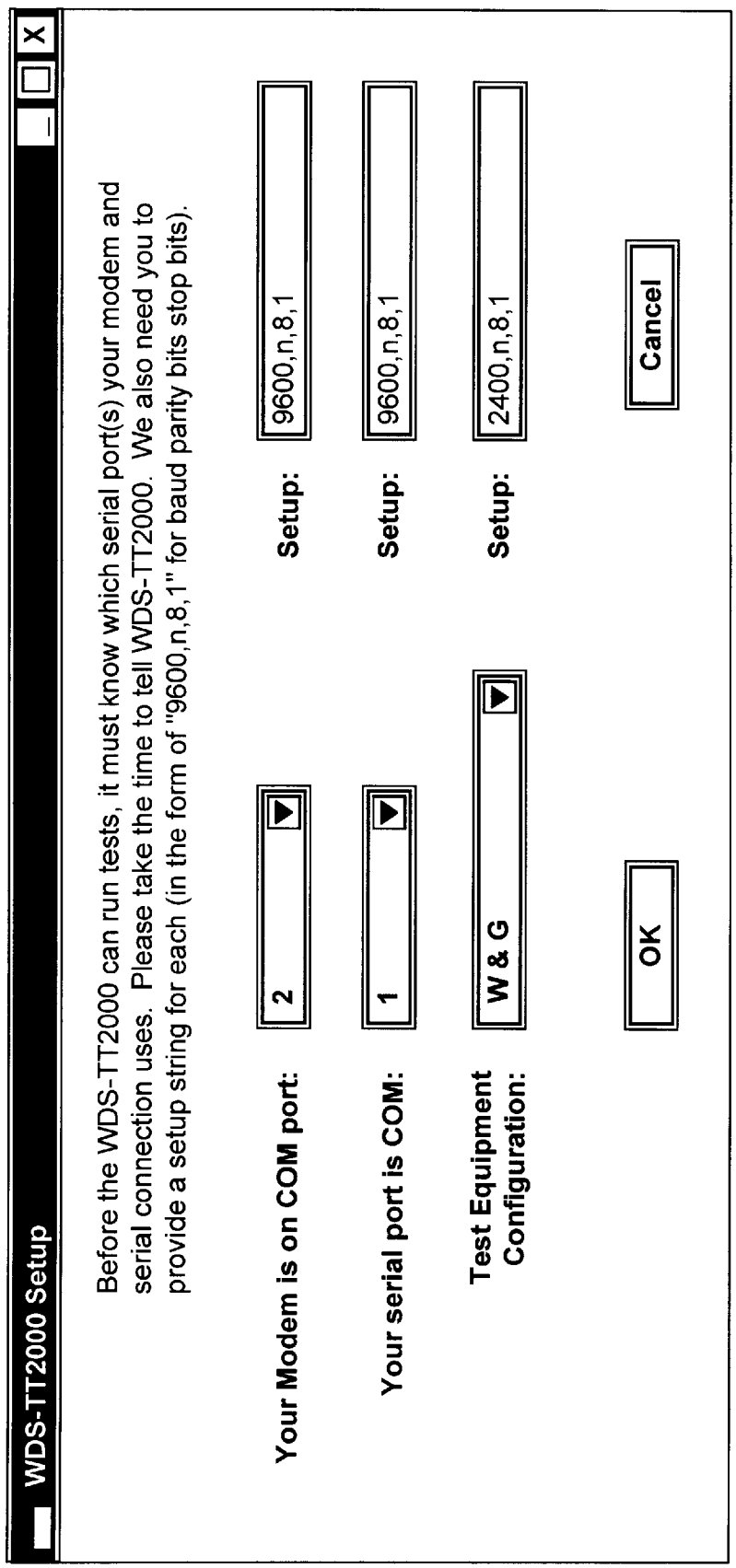
Figure 2C:
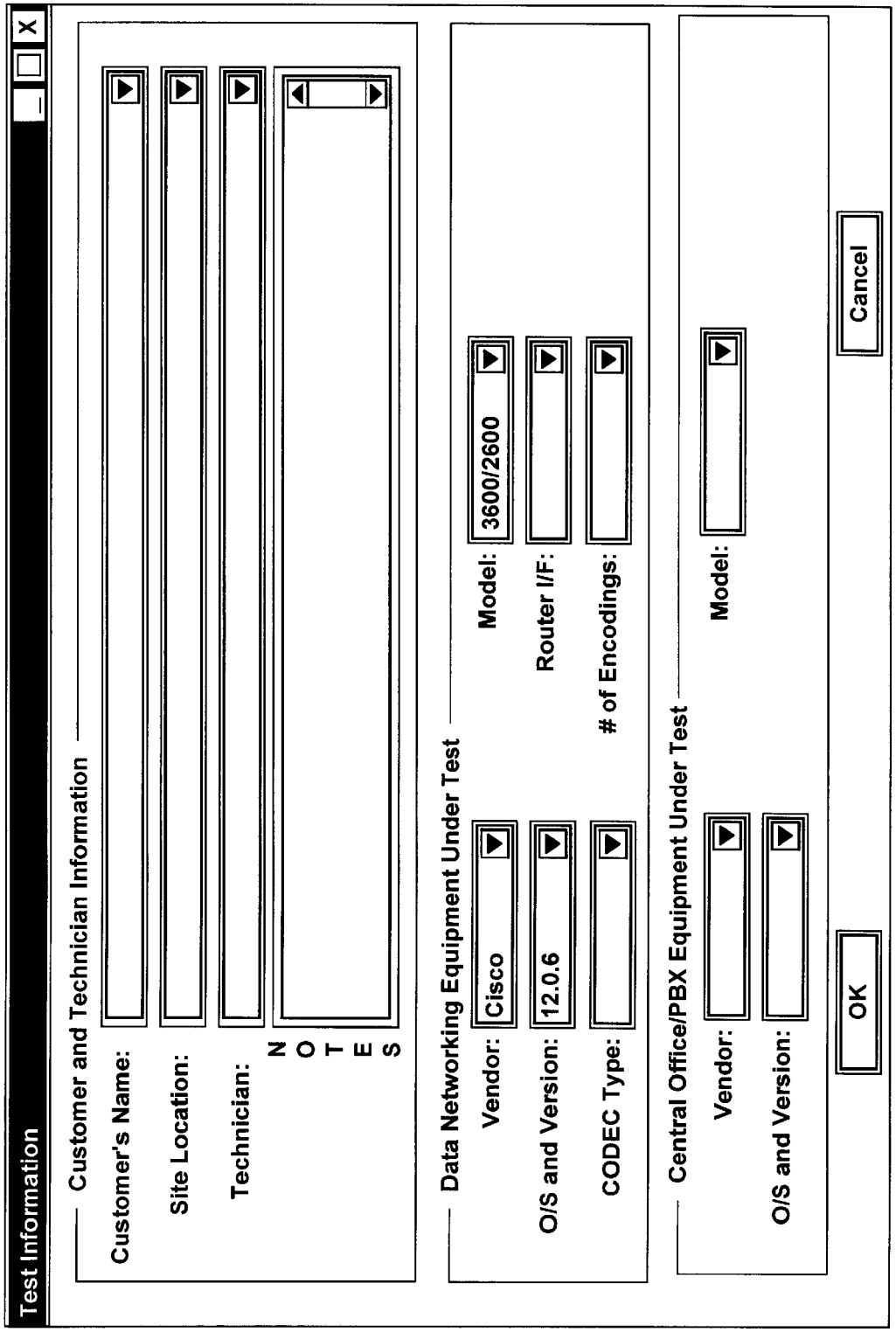
Figure 2D:
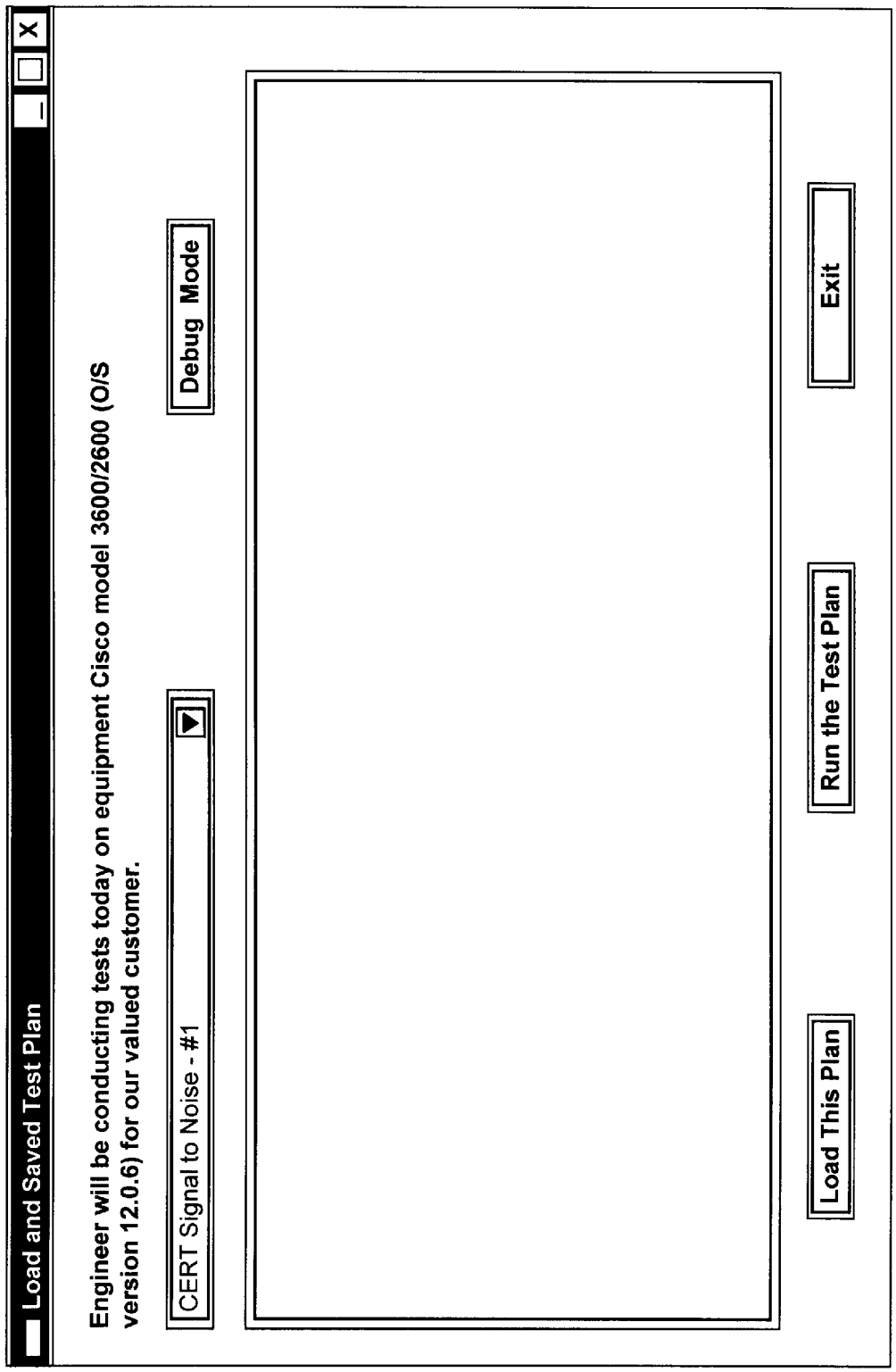
Figure 2E:
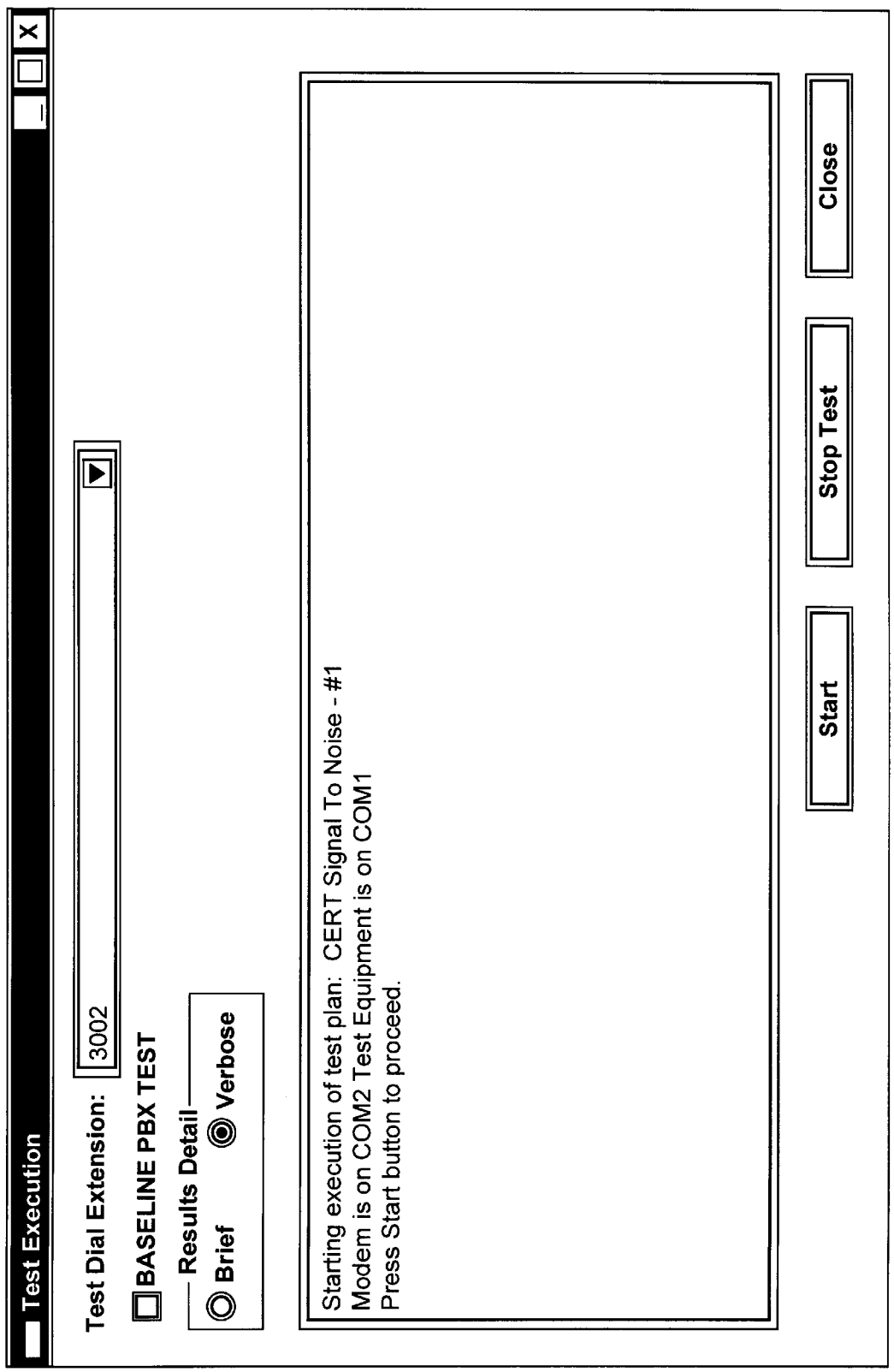
Figure 2F:
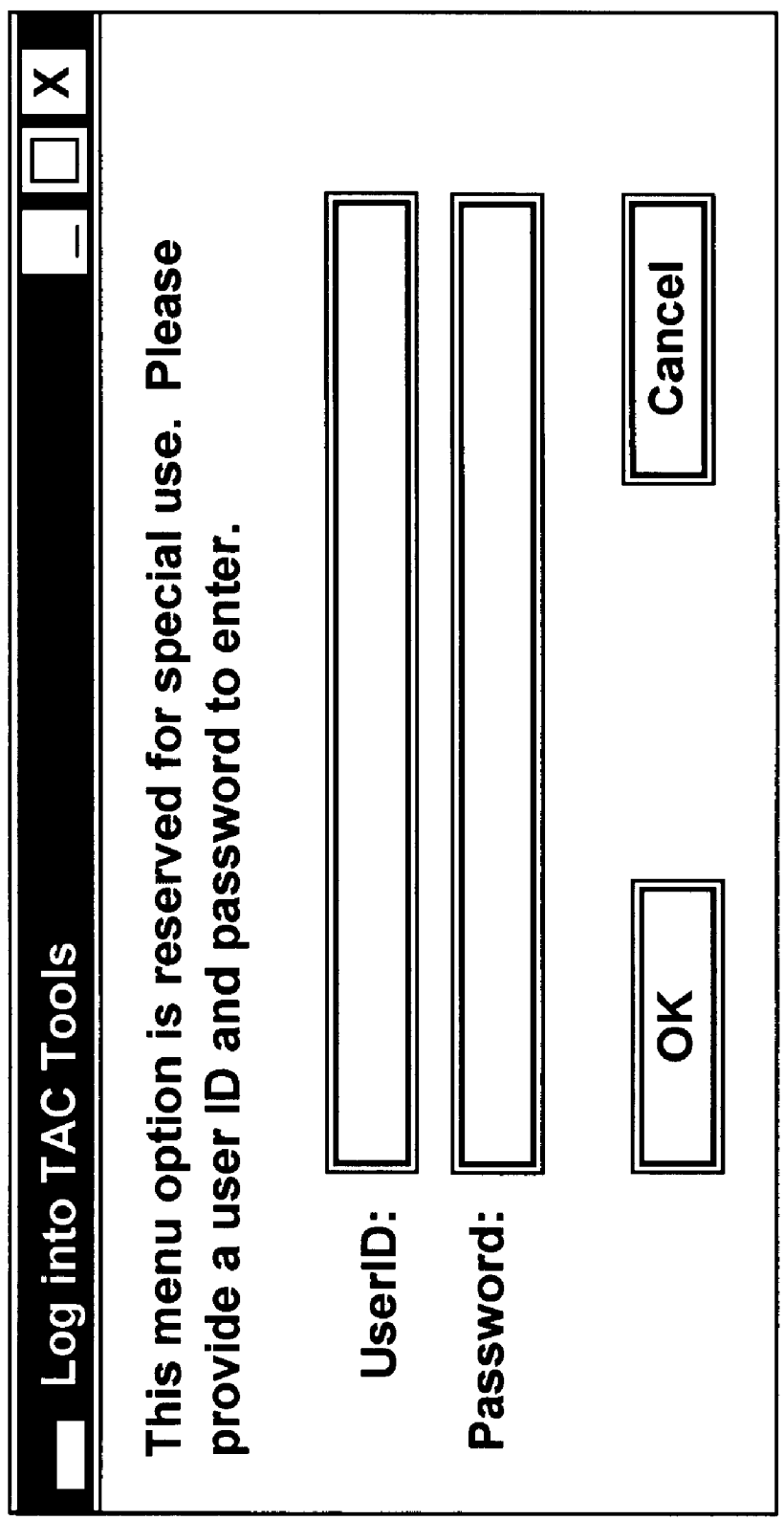
Figure 2G:
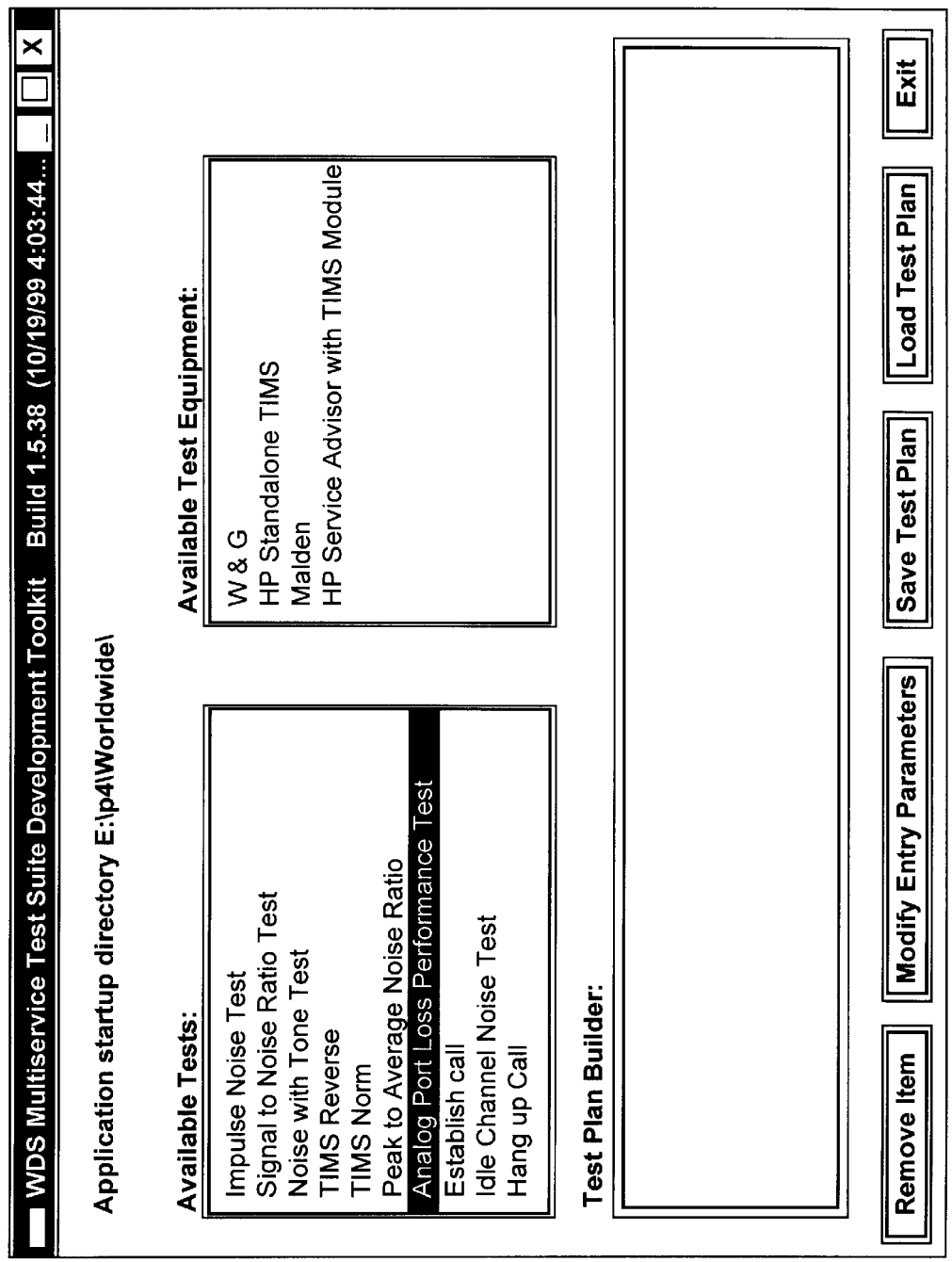
Figure 2H:
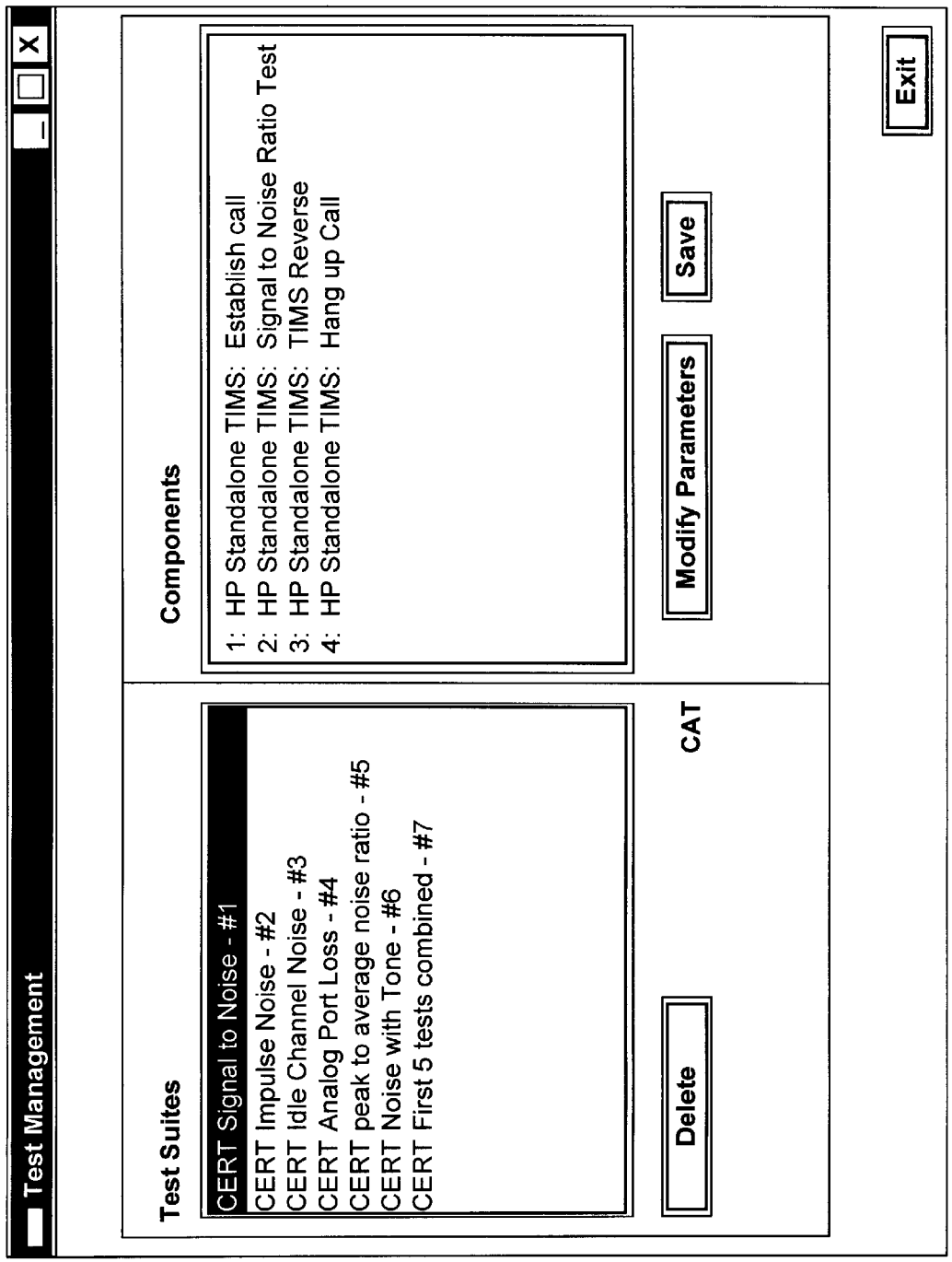

The present invention consists of a group of hierarchically related screens. All of these screens are accessible from the main menu screen. The main menu screen is illustrated in FIG. 2a. The initial setup screen is illustrated in FIG. 2b. This screen is used to collect information that the software needs to perform its functions. Port assignment and configuration parameters are entered for the modem and serial ports for the computer 10 that the interface software 14 is running on. These values will override those specified for the serial port automatically as needed for the specific test equipment 12. FIG. 2c represents the entry screen for the network configuration information. This information is important because the results generated for each particular test depend heavily on the configuration of the network under test. FIG. 2d represents the entry screen for the type of test or tests to be run on the network. This entry is performed by selecting the tests from a list of all the defined tests. FIG. 2e represents the test execution screen. This screen provides for the entry of supplementary information required to run the test. The screen also provides visual feedback of the actual progress of a test and also a method to stop/restart the test as desired by the operator. FIG. 2f illustrates the login screen. Any features of the software 14 that must be restricted for security purposes are protected by this screen. The operator must provide a valid ID and password prior to gaining access to the restricted features. FIG. 2g illustrates the test builder screen. This screen is a protected feature of the software that is utilized to build the tests to be performed on the network. The tests that are built through this screen are the tests that can be loaded and run on the network through the screen identified in FIG. 2d. FIG. 2h illustrates the test management screen. This screen allows the operator to modify existing scripts for the various tests to be performed on the network. FIG. 2i illustrates the screen that provides for the entry and modification of parameters for discrete test components.

The interface software 14 comprises a database file 13 that contains setup information, test plans and operation information. Typical definitions for the database file 13 are illustrated by the following:

Properties

| | | | |
|---|---|---|---|
| Date Created: | Oct. 1, 1999 11:15:55 AM | Def Updatable: | True |
| Last Updated: | Oct. 6, 1999 8:59:07 AM | OrderByOn: | False |
| RecordCount: | 4 | | |

Columns

| Name | Type | Size |
|---|---|---|
| coCode | Number (Long) | 4 |
| coText | Text | 50 |

Table Indexes

| Name | Number of Fields |
|---|---|
| Code | 1 |
| Fields: | coCode, Ascending |

Properties

| | | | |
|---|---|---|---|
| Date Created: | Jul. 9, 1999 9:14:11 AM | Def. Updatable: | True |
| Last Updated: | Jul. 9, 1999 9:35:34 AM | OrderByOn: | False |
| RecordCount: | 0 | | |

Columns

| Name | Type | Size |
|---|---|---|
| EventTime | Date/Time | 8 |
| Action | Text | 100 |
| Description | Text | 255 |

Properties

| | | | |
|---|---|---|---|
| Date Created: | Aug. 9, 1999 9:39:08 AM | Def. Updatable: | True |
| Last Updated: | Aug. 9, 1999 9:39:08 AM | OrderByOn: | False |
| RecordCount: | 6 | | |

Columns

| Name | Type | Size |
|---|---|---|
| Dial | Text | 50 |

Properties

| | | | |
|---|---|---|---|
| Date Created: | Jul. 15, 1999 12:24:21 PM | Def Updatable: | True |
| Last Updated: | Oct. 6, 1999 8:59:07 AM | OrderByOn: | False |
| RecordCount: | 6 | | |

Columns

| Name | Type | Size |
|---|---|---|
| vndVendorCode | Number (Long) | 4 |
| vndModelCode | Number (Long) | 4 |
| vndModeText | Text | 100 |

Table Indexes

| Name | Number of Fields |
|---|---|
| PrimaryKey | 2 |
| Fields: | vndVendorCode, Ascending |
| | vndModelCode, Ascending |
| vndEquipmentCode | 1 |
| Fields: | vndModelCode, Ascending |
| vndVendorCode | 1 |
| Fields: | vndVendorCode, Ascending |

Properties

| | | | |
|---|---|---|---|
| Date Created: | Jul. 15, 1999 12:24:06 PM | Def. Updatable: | True |
| Last Updated: | Oct. 6, 1999 8:59:07 AM | OrderByOn: | False |
| RecordCount: | 15 | | |

Columns

| Name | Type | Size |
|---|---|---|
| vndVendorCode | Number (Long) | 4 |
| vndModelCode | Number (Long) | 4 |
| vndOSCode | Number (Long) | 4 |
| vndOSText | Text | 100 |

Table Indexes

| Name | Number of Fields |
|---|---|
| PrimaryKey | 3 |

-continued

| | | Fields: | vndVendorCode, Ascending |
| --- | --- | --- | --- |
| | | | vndModelCode, Ascending |
| | | | vndOSCode, Ascending |
| vndModelCode | | | 1 |
| Fields: | | | vndModelCode, Ascending |
| vndOSCode | | | 1 |
| Fields: | | | vndOSCode, Ascending |
| vndVendorCode | | | 1 |
| Fields: | | | vndVendorCode, Ascending |
| Properties | | | |
| | | | |
| Date Created: | Jul. 15, 1999 12:24:33 PM | Def. Updatable: | True |
| Last Updated: | Oct. 6 1999 8:59:07 AM | OrderByOn: | False |
| RecordCount: | 4 | | |
| Columns | | | |
| | | | |
| Name | | Type | Size |
| vndCode | | Number (Long) | 4 |
| vndText | | Text | 100 |

Table Indexes

| Name | | Number of Fields | |
| --- | --- | --- | --- |
| PrimaryKey | | 1 | |
| Fields: | | vndCode, Ascending | |
| vndCode | | 1 | |
| Fields: | | vndCode, Ascending | |
| Properties | | | |
| | | | |
| Date Created: | Jul. 9, 1999 8:13:35 AM | Def Updatable: | True |
| Last Updated: | Oct. 6, 1999 8:59:07 AM | OrderByOn: | False |
| RecordCount: | 1 | | |
| Columns | | | |
| | | | |
| Name | | Type | Size |
| ID | | Number (Long) | 4 |
| Customer | | Text | 100 |

Table Indexes

| Name | | Number of Fields | |
| --- | --- | --- | --- |
| ID | | 1 | |
| Fields: | | ID, Ascending | |
| Properties | | | |
| | | | |
| Date Created: | Jul. 9, 1999 9:46:59 AM | Def Updatable: | True |
| Last Updated: | Oct. 6, 1999 8:59:07 AM | OrderByOn: | False |
| RecordCount: | 1 | | |
| Columns | | | |
| | | | |
| Name | | Type | Size |
| CustomerID | | Number (Long) | 4 |
| Site | | Text | 255 |
| Notes | | Text | 255 |

Table Indexes

| Name | | Number of Fields | |
| --- | --- | --- | --- |
| CustomerID | | 1 | |
| Fields: | | CustomerID, Ascending | |
| Properties | | | |
| | | | |
| Date Created: | Jul. 9, 1999 8:14:10 AM | Def. Updatable: | True |
| Last Updated: | Jul. 9, 1999 8:23:12 AM | OrderByOn: | False |
| RecordCount: | 1 | | |
| Columns | | | |
| | | | |
| Name | | Type | Size |
| Technician | | Text | 100 |
| Properties | | | |
| | | | |
| Date Created: | Aug. 5, 1999 2:45:30 PM | Def. Updatable: | True |
| Last Updated: | Aug. 5, 1999 2:58:50 PM | OrderByOn: | False |
| RecordCount: | 1 | | |
| Columns | | | |
| | | | |
| Name | | Type | Size |
| ModemPort | | Number (Long) | 4 |
| ModemConfig | | Text | 50 |
| SerialPort | | Number (Long) | 4 |
| SerialConfig | | Text | 50 |
| InitialSetup | | Yes/No | 1 |

-continued

Properties

| | | | |
|---|---|---|---|
| Date Created: | Jun. 6, 1999 3:52:57 PM | Def. Updatable: | True |
| Last Updated: | Oct. 6, 1999 8:59:07 AM | OrderByOn: | False |
| RecordCount: | 5 | | |

Columns

| Name | Type | Size |
|---|---|---|
| UserName | Text | 50 |
| Password | Text | 50 |

Table Indexes

| Name | Number of Fields |
|---|---|
| PrimaryKey | 1 |
| Fields: | UserName, Ascending |

Properties

| | | | |
|---|---|---|---|
| Date Created: | Apr. 4, 1999 6:18:37 AM | Def. Updatable: | True |
| Last Updated: | Oct. 6, 1999 8:59:07 AM | OrderByOn: | False |
| RecordCount: | 4 | | |

Columns

| Name | Type | Size |
|---|---|---|
| Code | Number (Long) | 4 |
| equName | Text | 100 |
| equHomeDir | Text | 200 |
| SerialString | Text | 50 |

Table Indexes

| Name | Number of Fields |
|---|---|
| Code | 1 |
| Fields: | Code, Ascending |
| PrimaryKey | 2 |
| Fields: | Code, Ascending |
| | equName, Ascending |

Properties

| | | | |
|---|---|---|---|
| Date Created: | Apr. 2, 1999 6:15:40 AM | Def. Updatable: | True |
| Last Updated: | Oct. 6, 1999 8:59:07 AM | OrderByOn: | False |
| RecordCount: | 10 | | |

Columns

| Name | Type | Size |
|---|---|---|
| Name | Text | 100 |
| Code | Number (Long) | 4 |
| Results | Yes/No | 1 |
| comments | Text | 100 |

Table Indexes

| Name | Number of Fields |
|---|---|
| Code | 1 |
| Fields: | Code, Ascending |
| Name | 1 |
| Fields: | Name, Ascending |
| PrimaryKey | 1 |
| Fields: | Code, Ascending |

Properties

| | | | |
|---|---|---|---|
| Date Created: | Oct. 1, 1999 12:01:52 PM | Def. Updatable: | True |
| Last Updated: | Oct. 6, 1999 8:59:07 AM | OrderByOn: | False |
| RecordCount: | 50 | | |

Columns

| Name | Type | Size |
|---|---|---|
| TestCode | Number (Long) | 4 |
| CODEC | Number (Long) | 4 |
| Encodings | Number (Long) | 4 |
| PBXBase | Yes/No | 1 |
| val1 | Number (Long) | 4 |
| val2 | Number (Long) | 4 |
| val3 | Number (Long) | 4 |
| val4 | Number (Long) | 4 |
| val5 | Number (Long) | 4 |
| val6 | Number (Long) | 4 |
| val7 | Number (Long) | 4 |
| val8 | Number (Long) | 4 |
| val9 | Number (Long) | 4 |
| val10 | Number (Long) | 4 |

-continued

Table Indexes

| Name | | Number of Fields | |
|---|---|---|---|
| CODEC | | 1 | |
| Fields: | | CODEC, Ascending | |
| TestCode | | 1 | |
| Fields: | | TestCode, Ascending | |

Properties

| Date Created: | Apr. 2, 1999 6:28:22 AM | Def. Updatable: | True |
|---|---|---|---|
| Last Updated: | Oct. 6, 1999 8:59:07 AM | OrderByOn: | False |
| RecordCount: | 34 | RowHeight: | 285 |

Columns

| Name | Type | Size |
|---|---|---|
| ScenarioNumber | Number (Long) | 4 |
| ScenarioSequence | Number (Long) | 4 |
| EquipmentCode | Number (Long) | 4 |
| TestNumber | Number (Long) | 4 |
| ScenarioName | Text | 100 |
| ScenarioType | Text | 50 |
| Param1 | Text | 50 |
| Param2 | Text | 50 |
| Param3 | Text | 50 |
| Param4 | Text | 50 |
| Param5 | Text | 50 |
| Param6 | Text | 50 |
| Param7 | Text | 50 |
| Param8 | Text | 50 |
| Param9 | Text | 50 |
| Param10 | Text | 50 |

Table Indexes

| Name | | Number of Fields | |
|---|---|---|---|
| EquipmentCode | | 1 | |
| Fields: | | EquipmentCode, Ascending | |
| PrimaryKey | | 2 | |
| Fields: | | ScenarioNumber, Ascending | |
| | | ScenarioSequence, Ascending | |

Properties

| Date Created: | Apr. 20, 1999 6:16:44 AM | Def. Updatable: | True |
|---|---|---|---|
| Last Updated: | Oct. 6, 1999 8:59:07 AM | OrderByOn: | False |
| RecordCount: | 12 | | |

Columns

| Name | Type | Size |
|---|---|---|
| EquCode | Number (Long) | 4 |
| TstCode | Number (Long) | 4 |
| Sequence | Number (Long) | 4 |
| Script | Text | 50 |
| Comments | Text | 100 |

Table Indexes

| Name | | Number of Fields | |
|---|---|---|---|
| EquCode | | 1 | |
| Fields: | | EquCode, Ascending | |
| PrimaryKey | | 3 | |
| Fields: | | EquCode, Ascending | |
| | | TstCode, Ascending | |
| | | Sequence, Ascending | |
| TstCode | | 1 | |
| Fields: | | TstCode, Ascending | |

Properties

| Date Created: | Apr. 9, 1999 7:38:19 AM | Def. Updatable: | True |
|---|---|---|---|
| Last Updated: | Oct. 6, 1999 8:59:07 AM | OrderByOn: | True |
| RecordCount: | 35 | | |

Columns

| Name | Type | Size |
|---|---|---|
| TstCode | Number (Long) | 4 |
| equCode | Number (Long) | 4 |
| ResFileName | Text | 100 |
| p1Title | Text | 50 |
| p2Title | Text | 50 |
| p3Title | Text | 50 |
| p4Title | Text | 50 |
| p5Title | Text | 50 |

-continued

| | | | |
|---|---|---|---|
| p6Title | | Text | 50 |
| p7Title | | Text | 50 |
| p8Title | | Text | 50 |
| p9Title | | Text | 50 |
| p10Title | | Text | 50 |
| Table Indexes | | | |
| | | | |
| Name | | Number of Fields | |
| equCode | | 1 | |
| Fields: | | equCode, Ascending | |
| PrimaryKey | | 2 | |
| Fields: | | TstCode, Ascending | |
| | | equCode, Ascending | |
| TstCode | | 1 | |
| Fields: | | TstCode, Ascending | |
| Properties | | | |
| | | | |
| Date Created: | Jul. 8, 1999 1:41:55 PM | Def. Updatable: | True |
| Last Updated: | Oct. 6, 1999 8:59:07 AM | OrderByOn: | False |
| RecordCount: | 5 | | |
| Columns | | | |
| | | | |
| Name | | Type | Size |
| vndVendorCode | | Number (Long) | 4 |
| vndModelCode | | Number (Long) | 4 |
| vndModelText | | Text | 100 |
| Table Indexes | | | |
| | | | |
| Name | | Number of Fields | |
| PrimaryKey | | 2 | |
| Fields: | | vndVendorCode, Ascending | |
| | | vndModelCode, Ascending | |
| vndEquipmentCode | | 1 | |
| Fields: | | vndModelCode, Ascending | |
| vndVendorCode | | 1 | |
| Fields: | | vndVendorCode, Ascending | |
| Properties | | | |
| | | | |
| Date Created: | Jul. 8, 1999 1:45:28 PM | Def. Updatable; | True |
| Last Updated: | Oct. 6, 1999 8:59:07 AM | OrderByOn: | False |
| RecordCount: | 8 | | |
| Columns | | | |
| | | | |
| Name | | Type | Size |
| vndVendorCode | | Number (Long) | 4 |
| vndModelCode | | Number (Long) | 4 |
| vndOSCode | | Number (Long) | 4 |
| vndOSText | | Text | 100 |
| Table Indexes | | | |
| | | | |
| Name | | Number of Fields | |
| PrimaryKey | | 3 | |
| Fields: | | vndVendorCode, Ascending | |
| | | vndModelCode, Ascending | |
| | | vndOSCode, Ascending | |
| vndModelCode | | 1 | |
| Fields: | | vndModelCode, Ascending | |
| vndOSCode | | 1 | |
| Fields: | | vndOSCode, Ascending | |
| vndVendorCode | | 1 | |
| Fields: | | vndVendorCode, Ascending | |
| Properties | | | |
| | | | |
| Date Created: | Jul. 8, 1999 1:40:25 PM | Def Updatable: | True |
| Last Updated: | Oct. 6, 1999 8:59:07 AM | OrderByOn: | False |
| RecordCount: | 2 | | |
| Columns | | | |
| | | | |
| Name | | Type | Size |
| vndCode | | Number (Long) | 4 |
| vndText | | Text | 100 |
| Table Indexes | | | |
| | | | |
| Name | | Number of Fields | |
| PrimaryKey | | 1 | |
| Fields: | | vndCode, Ascending | |
| vndCode | | 1 | |
| Fields: | | vndCode, Ascending | |

Typical queries for the database 13 are illustrated below:

Properties

| | | | |
|---|---|---|---|
| Date Created: | 7/1/99 3:04:55 PM | Def. Updatable: | True |
| Last Updated: | 7/1/99 3:05:09 PM | MaxRecords: | 0 |
| ODBCTimeout: | 60 | OrderByOn: | False |
| Record Locks: | Edited Record | Records Affected: | 0 |
| RecordsetType: | All Records | ReturnsRecords: | True |
| Type: | Select | | |

SQL

SELECT TestEquipment.*
FROM TestEquipment
WHERE (((TestEquipment.Code) = [intCode]));
Query Parameters

| Name | Type |
|---|---|
| [intCode] | Text |

Columns

| Name | Type | Size |
|---|---|---|
| Code | Number (Long) | 4 |
| equName | Text | 100 |
| equHomeDir | Text | 200 |
| SerialString | Text | 50 |

Table Indexes

| Name | Number of Fields |
|---|---|
| Code | 1 |
| PrimaryKey | 2 |

Properties

| | | | |
|---|---|---|---|
| Date Created: | 4/9/99 8:11:31 AM | Def. Updatable: | True |
| Last Updated: | 4/9/99 8:11:50 AM | MaxRecords: | 0 |
| ODBCTimeout: | 60 | OrderByOn: | False |
| Record Locks: | Edited Record | Records Affected: | 0 |
| RecordsetType: | All Records | ReturnsRecords: | True |
| Type: | Select | | |

SQL

SELECT TestEquipment.equName
FROM TestEquipment
WHERE (((TestEquipment.Code) = [intCode]));
Query Parameters

| Name | Type |
|---|---|
| [intCode] | Text |

Columns

| Name | Type | Size |
|---|---|---|
| equName | Text | 100 |

Table Indexes

| Name | Number of Fields |
|---|---|
| Code | 1 |
| PrimaryKey | 2 |

Properties

| | | | |
|---|---|---|---|
| Date Created: | 7/9/99 9:52:39 AM | Def. Updatable: | True |
| Last Updated: | 7/9/99 9:52:39 AM | MaxRecords: | 0 |
| ODBCTimeout: | 60 | OrderByOn: | False |
| Record Locks: | No Locks | Records Affected: | 0 |
| RecordsetType: | All Records | ReturnsRecords: | True |
| Type: | Select | | |

SQL

SELECT prmSite.*
FROM prmSite
WHERE (((prmSite.CustomerID) = [intID]));
Query Parameters

| Name | Type |
|---|---|
| [intID] | Text |

Columns

| Name | Type | Size |
|---|---|---|
| CustomerID | Number (Long) | 4 |
| Site | Text | 255 |
| Notes | Text | 255 |

Table Indexes

| Name | Number of Fields |
|---|---|
| CustomerID | 1 |

Properties

| | | | |
|---|---|---|---|
| Date Created: | 7/9/99 11:18:03 AM | Def. Updatable: | True |
| Last Updated: | 7/9/99 11:18:30 AM | MaxRecords: | 0 |
| ODBCTimeout: | 60 | OrderByOn: | False |
| Record Locks: | No Locks | Records Affected: | 0 |
| RecordsetType: | All Records | ReturnsRecords: | True |
| Type: | Select | | |

SQL

SELECT prmSite.*
FROM prmSite
WHERE (((prmSite.CustomerID) = [intID])
AND ((prmSite.Site) = [strSite]));
Query Parameters

| Name | Type |
|---|---|
| [intID] | Text |
| [strSite] | Text |

Columns

| Name | Type | Size |
|---|---|---|
| CustomerID | Number (Long) | 4 |
| Site | Text | 255 |
| Notes | Text | 255 |

Table Indexes

| Name | Number of Fields |
|---|---|
| CustomerID | 1 |

Properties

| | | | |
|---|---|---|---|
| Date Created: | 6/7/99 12:34:57 PM | Def. Updatable: | True |
| FailOnError: | False | Last Updated: | 6/7/99 12:39:59 PM |
| MaxRecords: | 0 | ODBCTimeout: | 60 |
| Record Locks: | Edited Record | Records Affected: | 0 |
| ReturnsRecords: | True | Type: | Update |
| UseTransaction: | True | | |

SQL

UPDATE TestScenarios SET TestScenarios.ScenarioType = "DEL"
WHERE (((TestScenarios.ScenarioNumber) = [intNum]));
Query Parameters

| Name | Type |
|---|---|
| [intNum] | Text |

Properties

| | | | |
|---|---|---|---|
| Date Created: | 4/2/99 4:15:51 PM | Def. Updatable: | True |
| Last Updated: | 6/8/99 7:00:20 AM | MaxRecords: | 0 |
| ODBCTimeout: | 60 | OrderByOn: | False |
| Record Locks: | No Locks | Records Affected: | 0 |
| RecordsetType: | All Records | ReturnsRecords: | True |
| RowHeight: | 285 | Type: | Select |

SQL

SELECT DISTINCT TestScenarios.ScenarioNumber,
TestScenarios.ScenarioName,
TestScenarios.ScenarioType
FROM TestScenarios
Query Parameters

| Name | Type |
|---|---|
| [strType1] | Text |
| [strType2] | Text |

Columns

| Name | Type | Size |
|---|---|---|
| ScenarioNumber | Number (Long) | 4 |
| ScenarioName | Text | 100 |
| ScenarioType | Text | 50 |

Table Indexes

| Name | Number of Fields |
|---|---|

-continued

| | | | | |
|---|---|---|---|---|
| EquipmentCode | 1 | | | |
| PrimaryKey | 2 | | | |
| Properties | | | | |
| Date Created: | 4/2/99 8:26:59 AM | Def. Updatable: | True | |
| Last Updated: | 4/2/99 8:26:59 AM | MaxRecords: | 0 | |
| ODBCTimeout: | 60 | OrderByOn: | False | |
| Record Locks: | Edited Record | Records Affected: | 0 | |
| RecordsetType: | All Records | ReturnsRecords: | True | |
| RowHeight: | 285 | Type: | Select | |
| SQL | | | | |

SELECT TestScenarios.*
FROM TestScenarios
WHERE (((TestScenarios.ScenarioNumber) = [intNum]));
Query Parameters

| Name | Type | |
|---|---|---|
| [intNum] | Text | |
| Columns | | |
| Name | Type | Size |
| ScenarioNumber | Number (Long) | 4 |
| ScenarioSequence | Number (Long) | 4 |
| EquipmentCode | Number (Long) | 4 |
| TestNumber | Number (Long) | 4 |
| ScenarioName | Text | 100 |
| ScenarioType | Text | 50 |
| Param1 | Text | 50 |
| Param2 | Text | 50 |
| Param3 | Text | 50 |
| Param4 | Text | 50 |
| Param5 | Text | 50 |
| Param6 | Text | 50 |
| Param7 | Text | 50 |
| Param8 | Text | 50 |
| Param9 | Text | 50 |
| Param10 | Text | 50 |
| Table Indexes | | |
| Name | Number of Fields | |
| EquipmentCode | 1 | |
| PrimaryKey | 2 | |
| Properties | | |

| | | | |
|---|---|---|---|
| Date Created: | 4/2/99 8:20:01 AM | Def. Updatable: | True |
| Last Updated: | 4/2/99 8:20:01 AM | MaxRecords: | 0 |
| ODBCTimeout: | 60 | OrderByOn: | False |
| Record Locks: | Edited Record | Records Affected: | 0 |
| RecordsetType: | All Records | ReturnsRecords: | True |
| RowHeight: | 285 | Type: | Select |
| SQL | | | |

SELECT Max(ScenarioNumber) AS MaxNum
FROM TestScenarios;
Columns

| Name | Type | Size |
|---|---|---|
| MaxNum | Number (Long) | 4 |
| Properties | | |

| | | | |
|---|---|---|---|
| Date Created: | 6/8/99 7:02:12 AM | Def. Updatable: | True |
| FailOnError: | False | Last Updated: | 6/8/99 7:02:27 AM |
| MaxRecords: | 0 | ODBCTimeout: | 60 |
| Record Locks: | Edited Record | Records Affected: | 0 |
| ReturnsRecords: | True | Type: | Delete |
| UseTransaction: | True | | |
| SQL | | | |

DELETE TestScenarios.ScenarioType, TestScenarios.ScenarioNumber
FROM TestScenarios
WHERE (((TestScenarios.ScenarioNumber) = [intNum]));
Query Parameters

| Name | Type |
|---|---|
| [intNum] | Text |

-continued

| | | | |
|---|---|---|---|
| Properties | | | |
| Date Created: | 4/9/99 7:44:22 AM | Def. Updatable: | True |
| Last Updated: | 4/9/99 7:44:23 AM | MaxRecords: | 0 |
| ODBCTimeout: | 60 | OrderByOn: | False |
| Record Locks: | Edited Record | Records Affected: | 0 |
| RecordsetType: | All Records | ReturnsRecords: | True |
| Type: | Select | | |
| SQL | | | |

SELECT TestList.Name, TestList.Code,
tstSupportedEquipment.equCode,
TestEquipment.equName
FROM (TestList INNER JOIN tstSupportedEquipment
ON TestList.Code =
tstSupportedEquipment.TstCode)
INNER JOIN TestEquipment ON tstSupportedEquipment.equCode
Query Parameters

| Name | Type | |
|---|---|---|
| [intCode] | Text | |
| Columns | | |
| Name | Type | Size |
| Name | Text | 100 |
| Code | Number (Long) | 4 |
| equCode | Number (Long) | 4 |
| equName | Text | 100 |
| Table Indexes | | |
| Name | Number of Fields | |
| Code | 1 | |
| Name | 1 | |
| PrimaryKey | 1 | |
| equCode | 1 | |
| PrimaryKey | 2 | |
| TstCode | 1 | |
| Code | 1 | |
| PrimaryKey | 2 | |
| Properties | | |

| | | | |
|---|---|---|---|
| Date Created: | 4/25/99 2:10:45 PM | Def. Updatable: | True |
| Last Updated: | 4/25/99 2:11:14 PM | MaxRecords: | 0 |
| ODBCTimeout: | 60 | OrderByOn: | False |
| Record Locks: | No Locks | Records Affected: | 0 |
| RecordsetType: | All Records | ReturnsRecords: | True |
| Type: | Select | | |
| SQL | | | |

SELECT tstSupportedEquipment.*
FROM tstSupportedEquipment
WHERE (((tstSupportedEquipment.TstCode) = [intTstCode]) AND
((tstSupportedEquipment.equCode) = [intEquCode]));
Query Parameters

| Name | Type | |
|---|---|---|
| [intTstCode] | Text | |
| [intEquCode] | Text | |
| Columns | | |
| Name | Type | Size |
| TstCode | Number (Long) | 4 |
| equCode | Number (Long) | 4 |
| ResFileName | Text | 100 |
| p1Title | Text | 50 |
| p2Title | Text | 50 |
| p3Title | Text | 50 |
| p4Title | Text | 50 |
| p5Title | Text | 50 |
| p6Title | Text | 50 |
| p7Title | Text | 50 |
| p8Title | Text | 50 |
| p9Title | Text | 50 |
| p10Title | Text | 50 |
| Table Indexes | | |
| Name | Number of Fields | |
| equCode | 1 | |
| PrimaryKey | 2 | |

-continued

```
TstCode                                         1
Properties

Date Created:      4/23/99 3:55:12 PM   Def. Updatable:     True
Last Updated:      4/23/99 3:55:12 PM   MaxRecords:         0
ODBCTimeout:       60                   OrderByOn:          False
Record Locks:      No Locks             Records Affected:   0
RecordsetType:     All Records          ReturnsRecords:     True
Type:              Select
SQL SELECT TestScripts.Script
FROM TestScripts
WHERE (((TestScripts.EquCode) = [intEqu])
AND ((TestScripts.TstCode) = [intTest]));
Query Parameters Name                                    Type
[intEqu]                                Text
[intTest]                               Text
Columns Name                                    Type              Size
Script                                  Text              50
Table Indexes Name                                    Number of Fields
EquCode                                 1
PrimaryKey                              3
TstCode                                 1
Properties Date Created:      4/2/99 7:31:48 PM    Def. Updatable:     True
Last Updated:      7/16/99              MaxRecords:         0
                   10:19:40 AM
ODBCTimeout:       60                   OrderByOn:          False
Record Locks:      No Locks             Records Affected:   0
RecordsetType:     All Records          ReturnsRecords:     True
Type:              Select
SQL SELECT TestList.*
FROM TestList
WHERE (((TestList.Code) = [intTest]));
Query Parameters Name                                    Type
[intTest]                               Text
Columns Name                                    Type              Size
Name                                    Text              100
Code                                    Number (Long)     4
Results                                 Yes/No            1
comments                                Text              100
Table Indexes Name                                    Number of Fields
Code                                    1
Name                                    1
PrimaryKey                              1
Properties Date Created:      6/6/99 3:54:29 PM    Def. Updatable:     True
Last Updated:      6/6/99 3:54:29 PM    MaxRecords:         0
ODBCTimeout:       60                   OrderByOn:          False
Record Locks:      No Locks             Records Affected:   0
RecordsetType:     All Records          ReturnsRecords:     True
Type:              Select
SQL SELECT TACUsers.*
FROM TACUsers
WHERE (((TACUsers.UserName) = [strUser]));
Query Parameters Name                                    Type
[strUser]                               Text
```

-continued

```
Columns

Name                                    Type              Size
UserName                                Text              50
Password                                Text              50
Table Indexes Name                                    Number of Fields
PrimaryKey                              1
Properties Date Created:      7/8/99 4:37:43 PM    Def. Updatable:     True
Last Updated:      7/8/99 4:37:43 PM    MaxRecords:         0
ODBCTimeout:       60                   OrderByOn:          False
Record Locks:      No Locks             Records Affected:   0
RecordsetType:     All Records          ReturnsRecords:     True
Type:              Select
SQL SELECT vndModel.*
FROM vndModel
WHERE (((vndModel.vndVendorCode) = [intCode]));
Query Parameters Name                                    Type
[intCode]                               Text
Columns Name                                    Type              Size
vndVendorCode                           Number (Long)     4
vndModelCode                            Number (Long)     4
vndModelText                            Text              100
Table Indexes Name                                    Number of Fields
PrimaryKey                              2
vndEquipmentCode                        1
vndVendorCode                           1
Properties Date Created:      7/8/99 4:46:16 PM    Def. Updatable:     True
Last Updated:      7/8/99 4:48:35 PM    MaxRecords:         0
ODBCTimeout:       60                   OrderByOn:          False
Record Locks:      No Locks             Records Affected:   0
RecordsetType:     All Records          ReturnsRecords:     True
Type:              Select
SQL SELECT vndOS.*
FROM vndOS
WHERE (((vndOS.vndVendoCode) = [intVendor])
AND ((vndOS.vndModelCode) = [intModel]));
Query Parameters Name                                    Type
[intVendor]                             Text
[intModel]                              Text
Columns Name                                    Type              Size
vndVendorCode                           Number (Long)     4
vndModelCode                            Number (Long)     4
vndOSCode                               Number (Long)     4
vndOSText                               Text              100
Table Indexes Name                                    Number of Fields
PrimaryKey                              3
vndModelCode                            1
vndOSCode                               1
vndVendorCode                           1
Properties Date Created:      7/15/99              Def. Updatable:     True
                   12:27:40 PM
Last Updated:      7/15/99              MaxRecords:         0
                   12:29:46 PM
ODBCTimeout:       60                   OrderByOn:          False
Record Locks:      No Locks             Records Affected:   0
```

-continued

| | | | |
|---|---|---|---|
| RecordsetType: | All Records | ReturnsRecords: | True |
| Type: | Select | | |
| SQL | | | |

SELECT PBXvndModel.*
FROM PBXvndModel
WHERE (((PBXvndModel.vndVendorCode) = [intCode]));
Query Parameters

| Name | Type |
|---|---|
| [intCode] | Text |

Columns

| Name | Type | Size |
|---|---|---|
| vndVendorCode | Number (Long) | 4 |
| vndModelCode | Number (Long) | 4 |
| vndModelText | Text | 100 |

Table Indexes

| Name | Number of Fields |
|---|---|
| PrimaryKey | 2 |
| vndEquipmentCode | 1 |
| vndVendorCode | 1 |

Properties

| | | | |
|---|---|---|---|
| Date Created: | 7/15/99 12:27:57 PM | Def. Updatable: | True |
| Last Updated: | 7/15/99 12:31:04 PM | MaxRecords: | 0 |
| ODBCTimeout: | 60 | OrderByOn: | False |
| Record Locks: | No Locks | Records Affected: | 0 |
| RecordsetType: | All Records | ReturnsRecords: | True |
| Type: | Select | | |
| SQL | | | |

SELECT PBXvndOS.*
FROM PBXvndOS
WHERE (((PBXvndOS.vndVendorCode) = [intVendor]) AND
((PBXvndOS.vndModelCode) = [intModel]));
Query Parameters

| Name | Type |
|---|---|
| [intVendor] | Text |
| [intModel] | Text |

Columns

| Name | Type | Size |
|---|---|---|
| vndVendorCode | Number (Long) | 4 |
| vndModelCode | Number (Long) | 4 |
| vndOSCode | Number (Long) | 4 |
| vndOSText | Text | 100 |

-continued

Table Indexes

| Name | Number of Fields |
|---|---|
| PrimaryKey | 3 |
| vndModelCode | 1 |
| vndOSCode | 1 |
| vndVendorCode | 1 |

The one-dimensional matrix approach is essentially the generation of the test score described above. This one-dimensional matrix approach produces a description of any problems detected in the communications network as well as the potential cause of problems. This description is provided in relatively general terms from prior experience and is independent of the specific network being subjected to the test.

The five-dimensional matrix approach incorporates the test score or one-dimensional results but also uses specific information from the network under test. The five dimensions of this analysis are the test score, the specific test conducted on the network, the equipment comprising the network to be diagnosed including the vendor for the test equipment and model and the version of the O/S.

The five-dimensional matrix approach provides very specific causes for whatever problems with the network are detected and also provides suggested remedies for those problems. This analysis/remedial action is tailored to the specifics of the equipment under test down to the level of the O/S level running on the equipment. The analysis and suggested remedies are performed by the software 14 with reference to a database 15 of such problems and remedies stored in the computer. The database 15 is created from the experience of manually diagnosing and solving problems with communications networks. Thus, the software 14 completely automates a process that involved several time-consuming manual steps in prior methods. Although the present embodiment contemplates use of a five-dimensional matrix analysis, the use of any n-dimensional matrix could be incorporated without departing from the spirit or scope of the present invention.

Typical data table definitions for the database 15 are illustrated by the following:

Properties

| | | | |
|---|---|---|---|
| Date Created: | Oct. 4, 1999 2:07:13 PM | Def. Updatable: | True |
| Last Updated: | Oct. 6, 1999 8:59:28 AM | OrderByOn: | False |
| RecordCount: | 416 | RowHeight: | 405 |

Columns

| Name | Type | Size |
|---|---|---|
| rtVendor | Number (Long) | 4 |
| rtModel | Number (Long) | 4 |
| CODEC | Number (Long) | 4 |
| NumEncodings | Number (Long) | 4 |
| Test | Number (Long) | 4 |
| Analysis | Memo | — |

Table Indexes

| Name | Number of Fields |
|---|---|
| CODEC | 1 |
| Fields: | CODEC, Ascending |
| NumEncodings | 1 |
| Fields: | NumEncodings, Ascending |
| PrimaryKey | 5 |

-continued

| | | | |
|---|---|---|---|
| Fields: | | rtVendor, Ascending | |
| | | rtModel, Ascending | |
| | | CODEC, Ascending | |
| | | NumEncodings, Ascending | |
| | | Test, Ascending | |

Properties

| | | | |
|---|---|---|---|
| DatasheetFontHeight: | 10 | DatasheetFontItalic: | False |
| DatasheetFontName: | Arial | DatasheetFontUnderli | False |
| DatasheetFontWeight: | Normal | DatasheetForeColor: | 33554432 |
| Date Created: | Jul. 9, 1999 1:51:06 PM | Def Updatable: | True |
| Last Updated: | Oct. 6, 1999 8:59:28 AM | OrderByOn: | False |
| RecordCount: | 85 | RowHeight: | 3400 |
| Tabular Char Set: | 0 | Tabular Family: | 34 |

Columns

| Name | Type | Size |
|---|---|---|
| Vendor | Number (Long) | 4 |
| Model | Number (Long) | 4 |
| OS | Number (Long) | 4 |
| Test | Number (Long) | 4 |
| Analysis1 | Memo | — |
| Analysis2 | Memo | — |
| Analysis3 | Memo | — |
| Analysis4 | Memo | — |
| Analysis5 | Memo | — |
| Analysis6 | Memo | — |
| Analysis7 | Memo | — |
| Analysis8 | Memo | — |
| Analysis9 | Memo | — |
| Analysis10 | Memo | — |

Table Indexes

| Name | Number of Fields |
|---|---|
| PrimaryKey | 4 |
| Fields: | Vendor, Ascending |
| | Model, Ascending |
| | OS, Ascending |
| | Test, Ascending |

Properties

| | | | |
|---|---|---|---|
| DatasheetFontHeight: | 10 | DatasheetFontItalic: | False |
| DatasheetFontName: | Arial | DatasheetFontUnderli | False |
| DatasheetFontWeight: | Normal | DatasheetForeColor: | 33554432 |
| Date Created: | Aug. 16, 1999 10:48:36 AM | Def. Updatable: | True |
| Last Updated: | Oct. 6, 1999 8:59:28 AM | OrderByOn: | False |
| RecordCount: | 85 | RowHeight: | 4000 |
| Tabular Char Set: | 0 | Tabular Family: | 34 |

Columns

| Name | Type | Size |
|---|---|---|
| Vendor | Number (Long) | 4 |
| Model | Number (Long) | 4 |
| OS | Number (Long) | 4 |
| Test | Number (Long) | 4 |
| Analysis1 | Memo | — |
| Analysis2 | Memo | — |
| Analysis3 | Memo | — |
| Analysis4 | Memo | — |
| Analysis5 | Memo | — |
| Analysis6 | Memo | — |
| Analysis7 | Memo | — |
| Analysis8 | Memo | — |
| Analysis9 | Memo | — |
| Analysis10 | Memo | — |

Table Indexes

| Name | Number of Fields |
|---|---|
| PrimaryKey | 4 |
| Fields: | Vendor, Ascending |
| | Model, Ascending |
| | OS, Ascending |
| | Test, Ascending |

Properties

| | | | |
|---|---|---|---|
| Date Created: | Oct. 5, 1999 2:30:56 PM | Def. Updatable: | True |
| Last Updated: | Oct. 5, 1999 2:30:56 PM | RecordCount: | 30 |

-continued

Columns

| Name | Type | Size |
|---|---|---|
| rtVendor | Number (Long) | 4 |
| rtModel | Number (Long) | 4 |
| CODEC | Number (Long) | 4 |
| NumEncodings | Number (Long) | 4 |
| Test | Number (Long) | 4 |
| Analysis | Memo | — |

Properties

| | | | |
|---|---|---|---|
| DatasheetFontHeight: | 10 | DatasheetFontItalic: | False |
| DatasheetFontName: | Arial | DatasheetFontUnderli | False |
| DatasheetFontWeight: | Normal | DatasheetForeColor: | 33554432 |
| Date Created: | Oct. 4, 1999 4:07:16 PM | Def. Updatable: | True |
| Last Updated: | Oct. 6, 1999 8:59:28 AM | OrderByOn: | False |
| RecordCount: | 12 | RowHeight: | 1395 |
| Tabular Char Set: | 0 | Tabular Family: | 34 |

Columns

| Name | Type | Size |
|---|---|---|
| Vendor | Number (Long) | 4 |
| Model | Number (Long) | 4 |
| OS | Number (Long) | 4 |
| Test | Number (Long) | 4 |
| Analysis1 | Memo | — |
| Analysis2 | Memo | — |
| Analysis3 | Memo | — |
| Analysis4 | Memo | — |
| Analysis5 | Memo | — |
| Analysis6 | Memo | — |
| Analysis7 | Memo | — |
| Analysis8 | Memo | — |
| Analysis9 | Memo | — |
| Analysis10 | Memo | — |

Table Indexes

| Name | Number of Fields |
|---|---|
| PrimaryKey | 4 |
| Fields: | Vendor, Ascending |
| | Model, Ascending |
| | OS, Ascending |
| | Test, Ascending |

Properties

| | | | |
|---|---|---|---|
| DatasheetFontHeight: | 10 | DatasheetFontItalic: | False |
| DatasheetFontName: | Arial | DatasheetFontUnderli | False |
| DatasheetFontWeight: | Normal | DatasheetForeColor: | 33554432 |
| Date Created: | Aug. 16, 1999 6:53:47 AM | Def. Updatable: | True |
| Last Updated: | Oct. 6, 1999 8:59:28 AM | OrderByOn: | False |
| RecordCount: | 83 | RowHeight: | 4380 |
| Tabular Char Set: | 0 | Tabular Family: | 34 |

Columns

| Name | Type | Size |
|---|---|---|
| Vendor | Number (Long) | 4 |
| Model | Number (Long) | 4 |
| OS | Number (Long) | 4 |
| Test | Number (Long) | 4 |
| Analysis1 | Memo | — |
| Analysis2 | Memo | — |
| Analysis3 | Memo | — |
| Analysis4 | Memo | — |
| Analysis5 | Memo | — |
| Analysis6 | Memo | — |
| Analysis7 | Memo | — |
| Analysis8 | Memo | — |
| Analysis9 | Memo | — |
| Analysis10 | Memo | — |

Table Indexes

| Name | Number of Fields |
|---|---|
| PrimaryKey | 4 |
| Fields: | Vendor, Ascending |
| | Model, Ascending |
| | OS, Ascending |
| | Test, Ascending |

-continued

Properties

| | | | |
|---|---|---|---|
| Date Created: | Jul. 9, 1999 3:18:28 PM | Def Updatable: | True |
| Last Updated: | Oct. 6, 1999 8:59:28 AM | OrderByOn: | False |
| RecordCount: | 6 | RowHeight: | 1050 |

Columns

| Name | Type | Size |
|---|---|---|
| Code | Number (Long) | 4 |
| Analysis1 | Memo | — |
| Analysis2 | Memo | — |
| Analysis3 | Memo | — |
| Analysis4 | Memo | — |
| Analysis5 | Memo | — |
| Analysis6 | Memo | — |
| Analysis7 | Memo | — |
| Analysis8 | Memo | — |
| Analysis9 | Memo | — |
| Analysis10 | Memo | — |

Table Indexes

| Name | Number of Fields |
|---|---|
| Code | 1 |
| Fields: | Code, Ascending |

Properties

| | | | |
|---|---|---|---|
| Date Created: | Oct. 4, 1999 9:15:50 AM | Def. Updatable; | True |
| Last Updated: | Oct. 6, 1999 8:59:28 AM | OrderByOn: | False |
| RecordCount: | 6 | | |

Columns

| Name | Type | Size |
|---|---|---|
| Vendor | Number (Long) | 4 |
| Model | Number (Long) | 4 |
| TipDoc | Text | 250 |

Table Indexes

| Name | Number of Fields |
|---|---|
| PrimaryKey | 2 |
| Fields: | Vendor, Ascending |
| | Model, Ascending |

Properties

| | | | |
|---|---|---|---|
| Date Created: | Oct. 4, 1999 7:58:26 AM | Def. Updatable: | True |
| Last Updated: | Oct. 4, 1999 7:58:29 AM | OrderByOn: | False |
| RecordCount: | 15 | | |

Columns

| Name | Type | Size |
|---|---|---|
| Spoke | Number (Long) | 4 |

Typical query definitions for the database 15 are illustrated by the following:

Properties

| | | | |
|---|---|---|---|
| Date Created: | 10/4/99 2:27:47 PM | Def. Updatable: | True |
| Last Updated: | 10/5/99 10:08:56 AM | MaxRecords: | 0 |
| ODBCTimeout: | 60 | OrderByOn: | False |
| Record Locks: | No Locks | Records Affected: | 0 |
| RecordsetType: | All Records | ReturnsRecords: | True |
| RowHeight: | 405 | Type: | Select |

SQL

SELECT CODEC.rtVendor, CODEC.rtModel,
CODEC.CODEC, CODEC.NumEncodings,
CODEC.Test, CODEC.Analysis
FROM CODEC
WHERE (((CODEC.rtVendor) = [intVendor])
AND ((CODEC.rtModel) = [intModel]) AND
((CODEC.CODEC) = [intCODEC]) AND ((CODEC.NumEncodings) =
[intNumEncodings]) AND
((CODEC.Test) = [intTest]));

-continued

Query Parameters

| Name | Type |
|---|---|
| [intVendor] | Text |
| [intModel] | Text |
| [intCODEC] | Text |
| [intNumEncodings] | Text |
| [intTest] | Text |

Columns

| Name | Type | Size |
|---|---|---|
| rtVendor | Number (Long) | 4 |
| rtModel | Number (Long) | 4 |
| CODEC | Number (Long) | 4 |
| NumEncodings | Number (Long) | 4 |
| Test | Number (Long) | 4 |
| Analysis | Memo | N/A |

Table Indexes

| Name | Number of Fields |
|---|---|
| CODEC | 1 |

-continued

| | | | |
|---|---|---|---|
| Clustered: | False | | |
| Distinct Count: | 5 | | |
| Foreign: | False | | |
| Ignore Nulls: | False | | |
| Name: | CODEC | | |
| Primary: | False | | |
| Required: | False | | |
| Unique: | False | | |
| NumEncodings | 1 | | |
| Clustered: | False | | |
| Distinct Count: | 5 | | |
| Foreign: | False | | |
| Ignore Nulls: | False | | |
| Name: | NumEncodings | | |
| Primary: | False | | |
| Required: | False | | |
| Unique: | False | | |
| PrimaryKey | 5 | | |
| Clustered: | False | | |
| Distinct Count: | 416 | | |
| Foreign: | False | | |
| Ignore Nulls: | False | | |
| Name: | PrimaryKey | | |
| Primary: | True | | |
| Required: | True | | |
| Unique: | True | | |

User Permissions admin
Group
Permissions

Admins
Users
Properties

| | | | |
|---|---|---|---|
| DatasheetFont-Height: | 10 | DatasheetFont-Italic: | False |
| DatasheetFont-Name: | Arial | DatasheetFont-Underli | False |
| DatasheetFont-Weight: | Normal | DatasheetFore-Color: | 33554432 |
| Date Created: | 7/30/99 2:14:55 PM | Def. Updatable: | True |
| Last Updated: | 7/30/99 2:14:55 PM | MaxRecords: | 0 |
| ODBCTimeout: | 60 | OrderByOn: | False |
| Record Locks: | No Locks | Records Affected: | 0 |
| RecordsetType: | All Records | ReturnsRecords: | True |
| RowHeight: | 3400 | Tabular Char Set: | 0 |
| Tabular Family: | 34 | Type: | Select |

SQL

SELECT EA.*
FROM EA
WHERE (((EA.Vendor) = [intVendor])
AND ((EA.Model) = [intModel])
AND ((EA.OS) = [intOS]) AND
((EA.Test) = [intTest]));
Query Parameters

| Name | Type | |
|---|---|---|
| [intVendor] | Text | |
| [intModel] | Text | |
| [intOS] | Text | |
| [intTest] | Text | |

Columns

| Name | Type | Size |
|---|---|---|
| Vendor | Number (Long) | 4 |
| Model | Number (Long) | 4 |
| OS | Number (Long) | 4 |
| Test | Number (Long) | 4 |
| Analysis1 | Memo | N/A |
| Analysis2 | Memo | N/A |
| Analysis3 | Memo | N/A |
| Analysis4 | Memo | N/A |
| Analysis5 | Memo | N/A |
| Analysis6 | Memo | N/A |
| Analysis7 | Memo | N/A |
| Analysis8 | Memo | N/A |

-continued

| | | | |
|---|---|---|---|
| Analysis9 | Memo | | N/A |
| Analysis10 | Memo | | N/A |

Table Indexes

| Name | | Number of Fields | |
|---|---|---|---|
| PrimaryKey | | 4 | |
| Clustered: | False | | |
| Distinct Count: | 85 | | |
| Foreign: | False | | |
| Ignore Nulls: | False | | |
| Name: | PrimaryKey | | |
| Primary: | True | | |
| Required: | True | | |
| Unique: | True | | |

User Permissions admin
Group
Permissions

Admins
Users
Properties

| | | | |
|---|---|---|---|
| DatasheetFont-Height: | 10 | DatasheetFont-Italic: | False |
| DatasheetFont-Name: | Arial | DatasheetFont-Underli | False |
| DatasheetFont-Weight: | Normal | DatasheetFore-Color: | 33554432 |
| Date Created: | 8/16/99 10:49:35 AM | Def. Updatable: | True |
| Last Updated: | 8/16/99 10:51:20 AM | MaxRecords: | 0 |
| ODBCTimeout: | 60 | OrderByOn: | False |
| Record Locks: | No Locks | Records Affected: | 0 |
| RecordsetType: | All Records | ReturnsRecords: | True |
| RowHeight: | 4000 | Tabular Char Set: | 0 |
| Tabular Family: | 34 | Type: | Select |

SQL

SELECT EAshort.*
FROM EAshort
WHERE (((EAshort.Vendor) = [intVendor])
AND ((EAshort.Model) = [intModel])
AND ((EAshort.OS) = [intOS])
AND ((EAshort.Test) = [intTest]));
Query Parameters

| Name | Type | |
|---|---|---|
| [intVendor] | Text | |
| [intModel] | Text | |
| [intOS] | Text | |
| [intTest] | Text | |

Columns

| Name | Type | Size |
|---|---|---|
| Vendor | Number (Long) | 4 |
| Model | Number (Long) | 4 |
| OS | Number (Long) | 4 |
| Test | Number (Long) | 4 |
| Analysis1 | Memo | N/A |
| Analysis2 | Memo | N/A |
| Analysis3 | Memo | N/A |
| Analysis4 | Memo | N/A |
| Analysis5 | Memo | N/A |
| Analysis6 | Memo | N/A |
| Analysis7 | Memo | N/A |
| Analysis8 | Memo | N/A |
| Analysis9 | Memo | N/A |
| Analysis10 | Memo | N/A |

Table Indexes

| Name | | Number of Fields | |
|---|---|---|---|
| PrimaryKey | | 4 | |
| Clustered: | | False | |

-continued

| | | | |
|---|---|---|---|
| Distinct Count: | 85 | | |
| Foreign: | False | | |
| Ignore Nulls: | False | | |
| Name: | Primarykey | | |
| Primary: | True | | |
| Required: | True | | |
| Unique: | True | | |

User Permissions admin
Group
Permissions

Admins
Users
Properties

| | | | |
|---|---|---|---|
| DatasheetFont-Height: | 10 | DatasheetFont-Italic: | False |
| DatasheetFont-Name: | Arial | DatasheetFont-Underli | False |
| DatasheetFont-Weight: | Normal | DatasheetFore-Color: | 33554432 |
| Date Created: | 10/5/99 11:49:49 AM | Def. Updatable; | True |
| Last Updated: | 10/5/99 11:49:49 AM | MaxRecords: | 0 |
| ODBCTimeout: | 60 | OrderByOn: | False |
| Record Locks: | No Locks | Records Affected: | 0 |
| RecordsetType: | All Records | ReturnsRecords: | True |
| RowHeight: | 1395 | Tabular Char Set: | 0 |
| Tabular Family: | 34 | Type: | Select |

SQL

SELECT PBXBaseEA.*
FROM PBXBaseEA
WHERE (((PBXBaseEA.Vendor) = [intvendor])
AND ((PBXBaseEA.Model) = [intModel]) AND
((PBXBaseEA.OS) = [intOS])
AND ((PBXBaseEA.Test) = [IntTest]));
Query Parameters

| Name | Type |
|---|---|
| [intVendor] | Text |
| [intModel] | Text |
| [intOS] | Text |
| [intTest] | Text |

Columns

| Name | Type | Size |
|---|---|---|
| Vendor | Number (Long) | 4 |
| Model | Number (Long) | 4 |
| OS | Number (Long) | 4 |
| Test | Number (Long) | 4 |
| Analysis1 | Memo | N/A |
| Analysis2 | Memo | N/A |
| Analysis3 | Memo | N/A |
| Analysis4 | Memo | N/A |
| Analysis5 | Memo | N/A |
| Analysis6 | Memo | N/A |
| Analysis7 | Memo | N/A |
| Analysis8 | Memo | N/A |
| Analysis9 | Memo | N/A |
| Analysis10 | Memo | N/A |

Table Indexes

| Name | Number of Fields |
|---|---|
| PrimaryKey | 4 |
| Clustered: | False |
| Distinct Count: | 12 |
| Foreign: | False |
| Ignore Nulls: | False |
| Name: | PrimaryKey |
| Primary: | True |
| Required: | True |
| Unique: | True |

-continued

User Permissions admin
Group
Permissions

Admins
Users
Properties

| | | | |
|---|---|---|---|
| DatasheetFont-Height: | 10 | DatasheetFont-Italic: | False |
| DatasheetFont-Name: | Arial | DatasheetFont-Underli | False |
| DatasheetFont-Weight: | Normal | DatasheetFore-Color: | 33554432 |
| Date Created: | 8/16/99 7:48:30 AM | Def. Updatable: | True |
| Last Updated: | 8/16/99 7:50:39 AM | MaxRecords: | 0 |
| ODBCTimeout: | 60 | OrderByOn: | False |
| Record Locks: | No Locks | Records Affected: | 0 |
| RecordsetType: | All Records | ReturnsRecords: | True |
| RowHeight: | 4380 | Tabular Char Set: | 0 |
| Tabular Family: | 34 | Type: | Select |

SQL

SELECT PBXEA.*
FROM PBXEA
WHERE (((PBXEA.Vendor) = [intVendor])
AND ((PBXEA Model) = [intModel])
AND ((PBXEA.OS) = [intOS])
AND ((PBXEA.Test) = [intTest]));
Query Parameters

| Name | Type |
|---|---|
| [intVendor] | Text |
| [intModel] | Text |
| [intOS] | Text |
| [intTest] | Text |

Columns

| Name | Type | Size |
|---|---|---|
| Vendor | Number (Long) | 4 |
| Model | Number (Long) | 4 |
| OS | Number (Long) | 4 |
| Test | Number (Long) | 4 |
| Analysis1 | Memo | N/A |
| Analysis2 | Memo | N/A |
| Analysis3 | Memo | N/A |
| Analysis4 | Memo | N/A |
| Analysis5 | Memo | N/A |
| Analysis6 | Memo | N/A |
| Analysis7 | Memo | N/A |
| Analysis8 | Memo | N/A |
| Analysis9 | Memo | N/A |
| Analysis10 | Memo | N/A |

Table Indexes

| Name | Number of Fields |
|---|---|
| PrimaryKey | 4 |
| Clustered: | False |
| Distinct Count: | 83 |
| Foreign: | False |
| Ignore Nulls: | False |
| Name: | PrimaryKey |
| Primary: | True |
| Required: | True |
| Unique: | True |

User Permissions admin
Group
Permissions

Admins
Users
Properties

| | | | |
|---|---|---|---|
| Date Created: | 10/4/99 9:24:46 AM | Def. Updatable: | True |
| Last Updated: | 10/4/99 9:36:59 AM | MaxRecords: | 0 |

-continued

| | | | |
|---|---|---|---|
| ODBCTimeout: | 60 | OrderByOn: | False |
| Record Locks: | No Locks | Records Affected: | 0 |
| RecordsetType: | All Records | ReturnsRecords: | True |
| Type: | Select | | |
| SQL | | | |

SELECT ToolTips.*
FROM ToolTips
WHERE (((ToolTips.Vendor) = [intVendor])
AND (ToolTips.Model) = [intModel]));
Query Parameters

| Name | Type | |
|---|---|---|
| [intVendor] | Text | |
| [intModel] | Text | |
| Columns | | |
| Name | Type | Size |
| Vendor | Number (Long) | 4 |
| Model | Number (Long) | 4 |
| TipDoc | Text | 250 |
| Table Indexes | | |
| Name | Number of Fields | |
| PrimaryKey | 2 | |
| Clustered: | False | |
| Distinct Count: | 3 | |
| Foreign: | False | |
| Ignore Nulls: | False | |
| Name: | PrimaryKey | |
| Primary: | True | |
| Required: | True | |
| Unique: | True | |
| User Permissions | | | admin
Group
Permissions

Admins
Users
Properties

| | | | |
|---|---|---|---|
| Date Created: | 7/9/99 3:31:35 PM | Def. Updatable: | True |
| Last Updated: | 7/9/99 3:31:35 PM | MaxRecords: | 0 |
| ODBCTimeout: | 60 | OrderByOn: | False |
| Record Locks: | No Locks | Records Affected: | 0 |
| RecordsetType: | All Records | ReturnsRecords: | True |
| RowHeight: | 1050 | Type: | Select |
| SQL | | | |

SELECT TestAnalysis.*
FROM TestAnalysis
WHERE (((TestAnalysis.Code) = (intCode]));
Query Parameters

| Name | Type | |
|---|---|---|
| [intCode] | Text | |
| Columns | | |
| Name | Type | Size |
| Code | Number (Long) | 4 |
| Analysis1 | Memo | N/A |
| Analysis2 | Memo | N/A |
| Analysis3 | Memo | N/A |
| Analysis4 | Memo | N/A |
| Analysis5 | Memo | N/A |
| Analysis6 | Memo | N/A |
| Analysis7 | Memo | N/A |
| Analysis8 | Memo | N/A |
| Analysis9 | Memo | N/A |
| Analysis10 | Memo | N/A |
| Table Indexes | | |
| Name | Number of Fields | |
| Code | 1 | |
| Clustered: | False | |
| Distinct Count: | 6 | |
| Foreign: | False | |

-continued

| | |
|---|---|
| Ignore Nulls: | False |
| Name: | Code |
| Primary: | False |
| Required: | False |
| Unique: | False |
| User Permissions | | admin
Group
Permissions

Admins
Users

Upon completion of the testing and analysis, the software 14 produces a summary of the tests conducted on the communications network. In the present embodiment, this summary is generated in Microsoft Word™ but other word processing program formats can also be utilized. The summary includes identification of each test that was run on the computer network, the input parameters used for the test, the results obtained from the test, the test score in common language, the general one-dimensional analysis for each test conducted, and the specific five-dimensional analysis for each test conducted. Table II shown below illustrates a typical report generated as a result of the five-dimensional matrix analysis.

Other features of the present invention that are unique include the ability to develop a suite of tests to be run and analyzed on one bulk unit. In addition, many such test suites can be created, run and directly managed as needed. The present invention also virtually eliminates error in the tests themselves and makes it possible to exactly repeat the tests over a wide range of customer sites and networks over long periods of time. The prior methods of performing the tests manually makes repeatability and error reduction extremely difficult if not virtually impossible.

Another feature of the present invention is that the software is adaptable in that as the present invention is used more data on problems and remedies in the networks are stored in the database. In effect, the software 14 provides the capability for the present invention to learn from prior problems as it is used and thus becomes more useful as time progresses. For example, as the present invention is used, the program will store information on customer name, address, and other information so that when the technician returns to a customer he or she will have a prior history on the customer and prior testing results readily available for reference.

Another possible extension of the present invention will be to build a time scheduling device into the software 14. This feature will allow the present invention to be installed at a customer site and to automatically conduct an array of tests at certain predetermined time intervals. This extension of the present invention can also include the ability to synchronize the computer 10 time with the network time for very specific time critical testing. In this manner, a technician will not have to be present during the entire period of time when testing is desired.

The purpose of the above description is to illustrate some embodiments of the present invention without implying a limitation therefrom. Those of ordinary skill in the art will recognize that the embodiments just described merely illustrate the principles of the present invention. Many modifications may be made thereto without departing from the spirit and scope of the invention.

What is claimed is:

1. A processing system for analyzing problems with communications networks comprising:
   a) test equipment for the communications networks selected from a plurality of available test equipment;
   b) a computer comprising interface software that is capable of communicating with and controlling the plurality of available test equipment through the transmission of electronic signals to the test equipment, a database comprising problems with communications networks and suggested remedies for the problems, means for analyzing data generated by the test equipment to determine problems with the communications networks and comparing those problems to the database to determine suggested remedies for the problems, and means for generating a report for the communications network to be tested, wherein the means for analyzing data generated by the test equipment comprises a one-dimensional matrix analysis and the means for generating a report for the communications network under test generates a report of the test score for the communications network, and wherein the means for analyzing data generated by the test equipment comprises a five-dimensional matrix analysis and the means for generating a report for the communications network under test generates a report of test score, the specific test conducted on the communications network, the VoIP vendor equipment, the VoIp vendor equipment model and the version of the O/S running on the VoIp under test.

2. The processing system of claim 1 wherein the means for analyzing data generated by the test equipment comprises an n-dimensional matrix analysis.

3. A computerized method for testing communications networks comprising:
   a) sending electronic signals from interface software installed on a computer to conventional test equipment for communications networks and thereby causing the test equipment to perform a plurality of tests on the communications network;
   b) sending output data generated from the test equipment as a result of the tests performed on the communications network through the interface software to the computer;
   c) processing the output data in the computer to identify problems with the communications network using an n-dimensional matrix approach;
   d) comparing any problems with the communications network to a data base of problems with communications networks installed on the computer;
   e) generating causes and suggested remedies for the problems from the database; and
   f) printing a report of the results of the tests conducted on the communications network including the cause and suggested remedy of the problem, wherein the processing of the output data comprises a one-dimensional matrix approach and the results of the tests conducted on the network are presented through the report of a test score and wherein the processing of the output data comprises a five-dimensional matrix approach and the results of the tests conducted on the network are presented through the report of a test score, the specific test conducted on the communications network, the VoIP equipment vendor, the VoIP equipment model and the version of the O/S running on the VoIP under test.

4. The method of claim 3 wherein the interface software is installed on a CPU of the conventional test equipment.

5. A processing system for analyzing problems with communications networks comprising:
   test equipment for the communications networks selected from a plurality of available test equipment comprising interface software a computer comprising interface software that is capable of communicating with and controlling the plurality of available test equipment through the transmission of electronic signals to the test equipment, a database comprising problems with communications networks and suggested remedies for the problems, means for analyzing data generated by the test equipment to determine problems with the communications networks and comparing those problems to the database to determine suggested remedies for the problems, and means for generating a report for the communications network to be tested, wherein the means for analyzing data generated by the test equipment comprises a five-dimensional matrix analysis and the means for generating a report for the communications network under test generates a report of test score, the specific test conducted on the communications network, the VoIP vendor equipment, the VoIp vendor equipment model and the version of the O/S running on the VoIp under test.

6. The processing system of claim 5 wherein the means for analyzing data generated by the test equipment comprises an n-dimensional matrix analysis.

7. The processing system of claim 5 wherein the means for analyzing data generated by the test equipment comprises a one-dimensional matrix analysis and the means for generating a report for the communications network under test generates a report of the test score for the communications network.

* * * * *

UNITED STATES PATENT AND TRADEMARK OFFICE
CERTIFICATE OF CORRECTION

PATENT NO. : 6,598,183 B1
DATED : July 22, 2003
INVENTOR(S) : Nicholas Grieco et al.

It is certified that error appears in the above-identified patent and that said Letters Patent is hereby corrected as shown below:

<u>Title page,</u>
Item [75], spelling of inventors' names should read -- Nicholas Grieco, James C. Hofmann, Gerald T. Hofmann, Luigi Grieco, Michael O'Brien --

Signed and Sealed this

Sixteenth Day of December, 2003

JAMES E. ROGAN
*Director of the United States Patent and Trademark Office*